(12) United States Patent
Nagai

(10) Patent No.: US 11,079,972 B2
(45) Date of Patent: Aug. 3, 2021

(54) SEMICONDUCTOR DEVICE

(71) Applicant: RENESAS ELECTRONICS CORPORATION, Tokyo (JP)

(72) Inventor: Masaru Nagai, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 18 days.

(21) Appl. No.: 16/456,317

(22) Filed: Jun. 28, 2019

(65) Prior Publication Data
US 2020/0026434 A1    Jan. 23, 2020

(30) Foreign Application Priority Data

Jul. 23, 2018 (JP) .............................. JP2018-137376

(51) Int. Cl.
*G06F 3/06* (2006.01)
*G06F 9/54* (2006.01)
*G06F 13/42* (2006.01)
*G06F 13/32* (2006.01)

(52) U.S. Cl.
CPC ............ *G06F 3/067* (2013.01); *G06F 3/0604* (2013.01); *G06F 3/0658* (2013.01); *G06F 3/0662* (2013.01); *G06F 9/544* (2013.01); *G06F 13/32* (2013.01); *G06F 13/42* (2013.01)

(58) Field of Classification Search
CPC ...... G06F 3/067; G06F 3/0662; G06F 3/0658; G06F 3/0604; G06F 9/544; G06F 13/42; G06F 13/32
See application file for complete search history.

(56) References Cited

U.S. PATENT DOCUMENTS

| 9,483,211 | B2 | 11/2016 | Okajima | |
|---|---|---|---|---|
| 2008/0168445 | A1* | 7/2008 | Olszewski | .......... G06F 11/3423 718/100 |
| 2012/0260017 | A1* | 10/2012 | Mine | ...................... G06F 9/544 710/308 |
| 2018/0203805 | A1* | 7/2018 | Hatta | ....................... G06F 9/50 |

FOREIGN PATENT DOCUMENTS

| JP | 2009-187313 A | 8/2009 |
|---|---|---|
| JP | 2015-069352 A | 4/2015 |

* cited by examiner

*Primary Examiner* — Masud K Khan
(74) *Attorney, Agent, or Firm* — McDermott Will & Emery LLP

(57) ABSTRACT

The memory includes a first descriptor area and a first data area corresponding to the first OS, and a second descriptor area and a second data area corresponding to the second OS. The second processor stores the first transmission instruction information corresponding to the transmission data stored in the second data area in the second descriptor area and transmits a first update notification of the second descriptor area to the first processor. In response to the first update notification, the first processor reads the first transmission instruction information stored in the second descriptor area and stores the first transmission instruction information in the first descriptor area. The communication circuit controlled by the first processor performs transmission process of transmission data stored in the second data area based on the first transmission instruction information stored in the first descriptor area.

3 Claims, 17 Drawing Sheets

SEMICONDUCTOR DEVICE

CROSS-REFERENCE TO RELATED APPLICATIONS

The disclosure of Japanese Patent Application No. 2018-137376 filed on Jul. 23, 2018 including the specification, drawings and abstract is incorporated herein by reference in its entirety.

BACKGROUND

The present invention relates to a semiconductor device and an information processing system, and, for example, the present invention relates to a semiconductor device and an information processing system in which a communication circuit is shared by a plurality of OSs (Operating System).

In a semiconductor device such as a microcomputer, direct memory access (Direct Memory Access) transfer is used to speed up data transfer between memories or between memories and I/O devices. In recent years, a descriptor type DMA transfer in which a descriptor area for controlling DMA transfer is secured and DMA transfer is performed in addition to a data storage area as a transfer target in a memory has become widespread. For example, in Japanese unexamined Patent Application publication No. 2009-187313, there is disclosed a technique related to descriptor control in descriptor type DMA transfer.

In Japanese unexamined Patent Application publication No. 2015-69352, there is disclosed a technique related to inter-OS communication between guest OSs in virtualization in order to integrate and control a plurality of storage systems. In Japanese unexamined Patent Application publication No. 2015-69352, guest OSs correspond to respective storage systems, and shared memories and interrupts in accordance with the IPI (Inter Processor Interrupt) method are used in inter-OS communication.

SUMMARY

Here, in a semiconductor device having a plurality of processors that execute OSs differing from each other, in order for a plurality of processors to share one communication circuit, security needs to be maintained. Therefore, it is considered that the first processor controls the communication circuit by using the techniques according to Japanese unexamined Patent Application publication No. 2009-187313 and Japanese unexamined Patent Application publication No. 2015-69352, and the remaining processors use the communication circuit by inter-OS communication with the first processor. However, the inventors have discovered that there is a new problem that the processing load of the processor may increase with an increase in the amount of data and the frequency of communication only by attempting to invent a related technique (to be described later) while referring to the techniques according to Japanese unexamined Patent Application publication No. 2009-187313 and Japanese unexamined Patent Application publication No. 2015-69352.

Other objects and novel features will become apparent from the description of this specification and the accompanying drawings.

Means of Solving the Problems

According to one embodiment, a semiconductor device comprises first and second processors executing different OSs, a memory, and a communication circuit controlled by the first processor. Here, the memory includes first and second descriptor areas and first and second data areas corresponding to the respective OSs. The second processor notifies the first processor that the communication instruction information corresponding to the second data area is stored in the second descriptor area. In response to the notification, the first processor stores the communication instruction information stored in the second descriptor area in the first descriptor area and instructs the communication circuit to transmit and receive data based on the communication instruction information.

According to the above-described embodiment, in a semiconductor device including a plurality of processors executing OSs differing from each other, when a plurality of processors shares one communication circuit, the processors can reduce the processing load.

DETAILED DESCRIPTION

Figure 1:
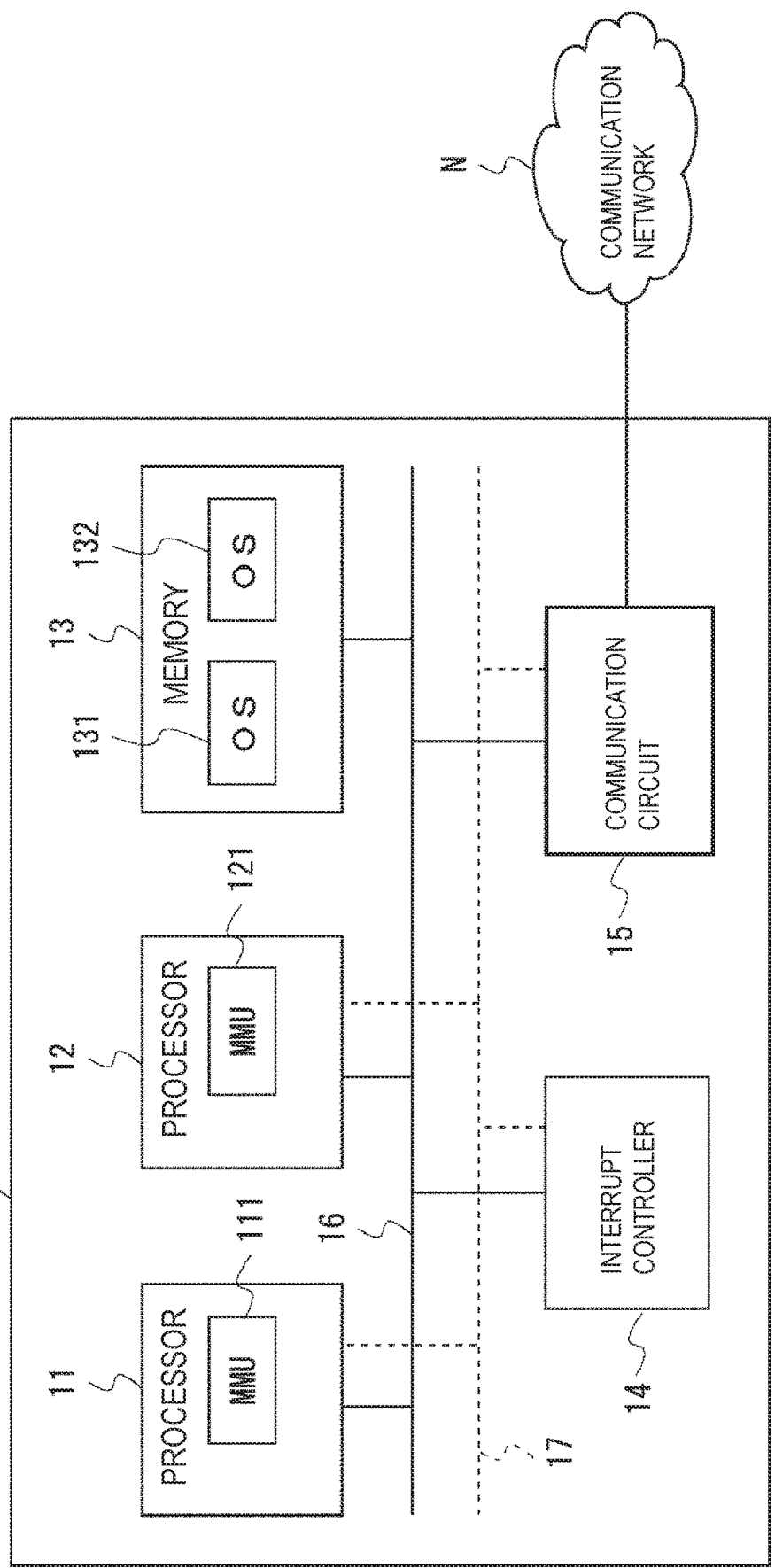
FIG. 1 is a block diagram showing a hardware configuration of a semiconductor device according to embodiment 1.

For clarity of explanation, the following description and drawings are appropriately omitted and simplified. In addition, the respective elements described in the drawings as functional blocks for performing various processes can be configured by a CPU (Central Processing Unit), a memory, and other circuits in terms of hardware, and be realized by programs loaded in the memory in terms of software. Therefore, it is understood by those skilled in the art that these functional blocks can be realized in various forms by hardware alone, software alone, or a combination thereof, and the present invention is not limited to any of them. In the drawings, the same elements are denoted by the same reference numerals, and a repetitive description thereof is omitted as necessary.

Also, the programs described above may be stored and provided to a computer using various types of non-transitory computer readable media. Non-transitory computer readable media includes various types of tangible storage media. Examples of non-transitory computer-readable media include magnetic recording media (e.g., flexible disks, magnetic tapes, hard disk drives), magneto-optical recording media (e.g., magneto-optical disks), CD-ROM (Read Only Memory, a CD-R, a CD-R/W, solid-state memories (e.g., masked ROM, PROM (Programmable ROM), EPROM (Erasable PROM, flash ROM, RAM (Random Access Memory)). The program may also be supplied to the computer by various types of transitory computer-readable media. Examples of transitory computer-readable media include electrical signals, optical signals, and electromagnetic waves. The transitory computer readable medium may provide the program to the computer via wired or wireless communication paths, such as electrical wires and optical fibers.

Figure 17:
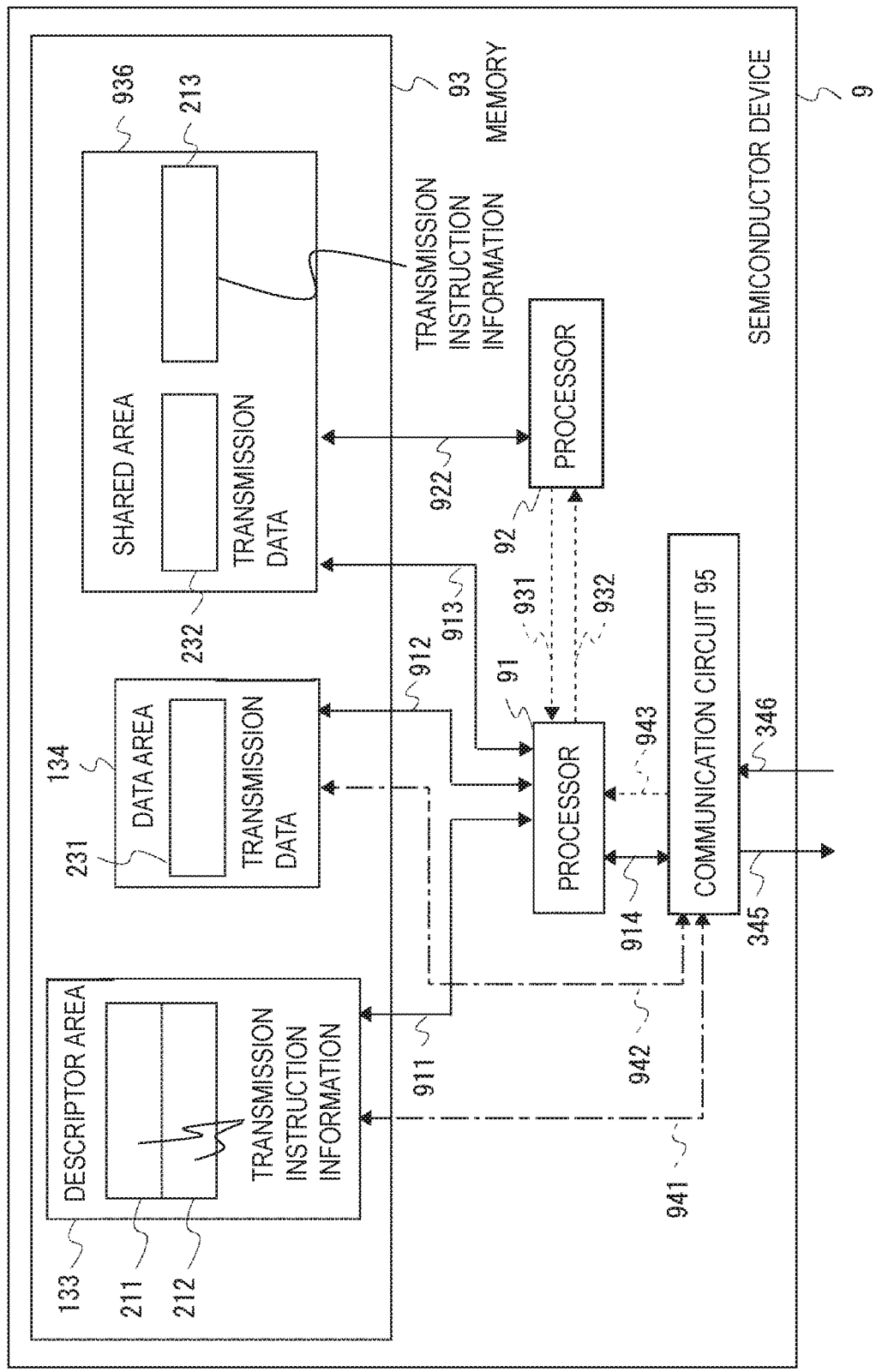
FIG. 17 is a functional block diagram illustrating a configuration of a semiconductor device according to a related art.

Here, the problem to be solved by the present embodiment will be described in detail. FIG. 17 is a functional diagram showing a configuration of the semiconductor device 9 according to the related art. The semiconductor device 9 includes processors 91 and 92, a memory 93, and a communication circuit 95. It is assumed that the semiconductor device 9 is also provided with an interrupt controller as a configuration not shown. The communication circuit 95 includes DMA controllers for performing DMA transfers between the memory 93 and circuits in the semiconductor device 9, and circuits for performing Ethernet communication with external networks. The communication circuit 95 corresponds to a descriptor type DMA transfer as described in Japanese unexamined Patent Application publication No. 2009-187313.

Each of the processors 91 and 92 is operated by an OS differing from each other. For example, it is assumed that the processor 91 executes a first OS, and the processor 92 executes a second OS. Here, since the communication circuit 95 is one, it is necessary for the processors 91 and 92 to share the communication circuit 95 in order for the first OS and the second OS to separately communicate with the outside. Thus, for example, the inventors considered the following related techniques with reference to the techniques disclosed in Japanese unexamined Patent Application publication No. 2009-187313 and Japanese unexamined Patent Application publication No. 2015-69352 described above. The first OS executed by the processor 91 manages and directly controls the communication circuit 95 as a hardware resource of the first OS. The processor 92 indirectly controls the communication circuit 95 by performing inter-OS communication with the processor 91. That is, the processors 91 and 92 cooperate to control the communication circuit 95. Specifically, it is as follows.

First, a descriptor area 133, a data area 134, and a shared area 936 are provided in the memory 93. The shared area 936 is an area shared by the processors 91 and 92, that is, an area accessible to both the processors 91 and 92. The shared area 936 stores the transmission data 232 when the second OS transmits data to the outside and the transmission instruction information 213, which is a descriptor for transmitting the transmission data 232 to the communication circuit 95. The data area 134 and the descriptor area 133 are areas that can be accessed by the processor 91 and areas that cannot be accessed by the processor 92. The data area 134 stores transmission data 231 when the first OS transmits data to the outside. The descriptor area 133 stores a plurality of descriptors for performing descriptor control in descriptor-type DMA transfer. Here, the descriptors include transmission instruction information 211 and 212 used in data transmission process to the outside in the communication circuit 95.

Here, a flow when the second operating system operating in the processor 92 transmits data to the outside of the semiconductor device 9 will be described.

(1) First, the processor 92 stores the transmission data 232 to be transmitted and the transmission instruction information 213 in the shared area 936 by the data access 922. Next, the processor 92 notifies the processor 91 to transmit the transmission data 232 by the IPI interrupt 931. Incidentally, the IPI interrupt 931 and the IPI interrupt 932, which will be described later, are performed by the IPI method via the above-described interrupt controller.

(2) In response to the notification by the IPI interrupt 931, the processor 91 reads the transmission data 232 and the transmission instruction information 213 from the shared area 936 by the data access 913. Then, the processor 91 stores, i.e., copies, the read transmission data 232 in the data area 134 as the transmission data 231 by the data access 912. The processor 91 stores, i.e., copies, the read transmission instruction information 213 as the transmission instruction information 211 in the descriptor area 133 by the data access 911. Here, the transmission instruction information 211 is a descriptor for causing the communication circuit 95 to transmit the transmission data 231 to the outside. Thereafter, the processor 91 notifies the communication circuit 95 of the transmission instruction by the data access 914.

(3) In response to a transmission instruction from the processor 91, the communication circuit 95 reads out the transmission instruction information 211 from the descriptor area 133 by the data access 941. Then, the communication circuit 95 reads the transmission data 231 from the data area 134 by the data access 942 based on the read transmission instruction information 211 and transmits the transmission data 231 to the outside by the data output 345. Thereafter, the communication circuit 95 records (adds) the transmission completion information in the transmission instruction information 211 in the descriptor area 133 by the data access 941. Then, the communication circuit 95 notifies the processor 91 of the completion by the completion interrupt 943. The completion interrupt 943 is performed via the interrupt controller described above.

(4) In response to the completion notification by the completion interrupt 943, the processor 91 reads the transmission instruction information 211 from the descriptor area 133 by the data access 911, and stores it in the shared area 936 by the data access 913, that is, updates or copies the transmission instruction information 213. Then, the processor 91 notifies the processor 92 of the completion of the transmission of the transmission data 232 by the IPI interrupt 932.

(5) In response to the notification of the completion of transmission by the IPI interrupt 932, the processor 92 refers to the transmission instruction information 213 in the shared area 936 by the data access 922 and confirms the transmission result (transmission completion information).

As described above, in the case of the related art described above, the copying process of the communication data (transmission data) between the shared area 936 and the data area 134 by the processor 91 occurs. For example, in the case of the Full-duplex Gigabit Ethernet, since the transmission and the reception become 1 Gbps, the data copying process of the 1 Gbps is loaded only by the transmission. Since an IPI interrupt occurs for each Ethernet communication, processing loads are generated by the interrupt response process. For example, if one communication by the Gigabit Ethernet is 64 bytes in the smallest frame size, 1488000 IPI interrupts per second occur. Therefore, a problem that the processing load of the processor may be high may occur. In view of the above, an embodiment for solving these problems will be described below.

Embodiment 1

A semiconductor device according to a first embodiment includes a first processor and a second processor that execute Operating System differing from each other, a memory, and a communication circuit controlled by the first processor. Here, the memory includes a first descriptor area and a first data area, which are work areas of a first OS executed by the first processor, and a second descriptor area and a second data area, which are work areas of a second OS executed by the second processor. The second processor stores first transmission instruction information corresponding to transmission data stored in the second data area in the second descriptor area and transmits a first update notification of the second descriptor area to the first processor. In response to the first update notification, the first processor reads the first transmission instruction information stored in the second descriptor area and stores the first transmission instruction information in the first descriptor area. The communication circuit performs transmission process of the transmission data stored in the second data area based on the first transmission instruction information stored in the first descriptor area. As a result, the copying process of the communication data between the data areas by the processor can be reduced, and the processing load of the processor can be reduced. In addition, a part of the communication processing in the first processor and the second processor can be made common, and the development efficiency can be improved.

Further, it is preferable that the first processor reads the transmission completion information of the transmission data stored in the first descriptor area by the communication circuit in response to the completion notification of the transmission process from the communication circuit, stores it in the second descriptor area, and transmits a second update notification of the second descriptor area to the second processor. In this case, the second processor refers to the transmission completion information stored in the second descriptor area in response to the second update notification. This makes it possible for the second processor to call up the same transmission confirmation process as the first processor, thereby further improving the development efficiency.

Alternatively, the second processor may store first reception instruction information for storing reception data in the second data area in the second descriptor area and transmit a third update notification of the second descriptor area to the first processor. In this case, in response to the third update notification, the first processor reads the first claim instruction information stored in the second descriptor area and stores the first reception instruction information in the first descriptor area. Thereafter, the first processor reads out the reception data stored in the first data area by the communication circuit in response to the completion notification of the reception process of the reception data from the communication circuit and determines the destination of the reception data. When the destination is determined to be the second OS or the second processor, the first processor stores the reception data in the second data area, and reads reception completion information corresponding to the reception data stored in the first descriptor area by the communication circuit from the first descriptor area and stores the information in the second descriptor area. As described above, in the reception process, similarly to the transmission process, the descriptor is transferred and a part of the communication processing can be shared, and the development efficiency is improved.

Each of the first OS and the second OS may be a virtual OS. That is, the present embodiment is applicable to a virtual OS. Further, the second data area and the second descriptor area are shared areas that can be accessed by data from each of the first processor on which the first OS operates and the second processor on which the second OS operates.

FIG. 1 is a block diagram showing a hardware configuration of a semiconductor device 1 according to the present first embodiment. The semiconductor device 1 is, for example, an information processing device such as a microcontroller, an embedded system, or a computer. The semiconductor device 1 is connected to a communication network N and can communicate with the outside. The semiconductor device 1 includes processors 11 and 12, a memory 13, an interrupt controller 14, and a communication circuit 15. The processors 11 and 12, the memory 13, the interrupt controller 14, and the communication circuit 15 are connected via a data bus 16. The processors 11 and 12, the interrupt controller 14, and the communication circuit 15 are connected via an interrupt signal line 17. Since the rest of the configuration of the semiconductor device 1 is well known, illustration and explanation thereof are omitted.

The memory 13 is a volatile storage device such as a random-access memory (RAM). The memory 13 stores an OS 131 and an OS 132. Here, the OS 131 is an exemplary first operating system and includes a function of controlling the communication circuit 15. Further, the OS 131 is assumed to be equal to or higher in security than the security of the OS 132. The OS 132 is an example of the second OS, and in the present embodiment, dose not directly control the communication circuit 15. That is, the OS 132 communicates with the communication circuit 15 via the OS 131. It is assumed that the OS 131 and 132 has a function of inter-OS communication by means of shared memory and interrupts via the interrupt controller 14 in accordance with the IPI system. Either or both of the OS 131 and 132 may be virtual OSs.

Each of the processors 11 and 12 is a control device such as a CPU or a Microprocessor Unit. The processor 11 has a Memory Management Unit 111. Since the other physical configurations of the processor 11 are well-known, illustration and detailed description thereof are omitted. The MMU 111 converts a virtual address recognized by the processor 11 and a physical address on the memory 13. The MMU 111 has a common memory-protecting function, a cache-controlling function, a bus-arbitrating function, and the like. The processor 11 communicates with the processor 12, the memory 13, the interrupt controller 14, the communication circuit 15, and the like via the data bus 16. The processor 11 transmits an interrupt request to the interrupt controller 14 via the interrupt signal line 17 and receives an interrupt notification from the interrupt controller 14.

Processor 11 is an example of a first processor that reads and executes the OS 131 stored in an external or internal storage device (not shown) into memory 13. Therefore, the processor 11 directly controls the communication circuit 15.

The processor 12 has a MMU 121. The MMU 121 has a function equivalent to that of the MMU 111 described above. Since the other physical configurations of the processor 12 are well-known, illustration and detailed description thereof are omitted. The processor 12 communicates with the processor 11, the memory 13, the interrupt controller 14, the communication circuit 15, and the like via the data bus 16. The processor 12 transmits an interrupt request to the interrupt controller 14 via the interrupt signal line 17 and receives an interrupt notification from the interrupt controller 14.

The processor 12 is an exemplary second processor and reads the OS 132 stored in another storage device, which is external or internal, into the memory 13 and executes the OS 132. Therefore, the processor 12 controls the communication circuit 15 via the processor 11.

The interrupt controller 14 receives an interrupt request from the processors 11 and 12 and the communication circuit 15 via the interrupt signal line 17 and sends an interrupt notification to the processors 11 and 12 and the communication circuit 15. In particular, the interrupt controller 14 supports inter-OS communication by the IPI system.

The communication circuit 15 includes DMA controllers for performing DMA transfers between the memory 13 and the outside of the semiconductor device 1, and circuits for performing Ethernet communication with the communication networks N. The communication circuit 15 corresponds to a descriptor type DMA transfer as described in Japanese unexamined Patent Application publication No. 2009-187313.

The communication network N is a network formed by a wired or wireless communication line.

Figure 2:
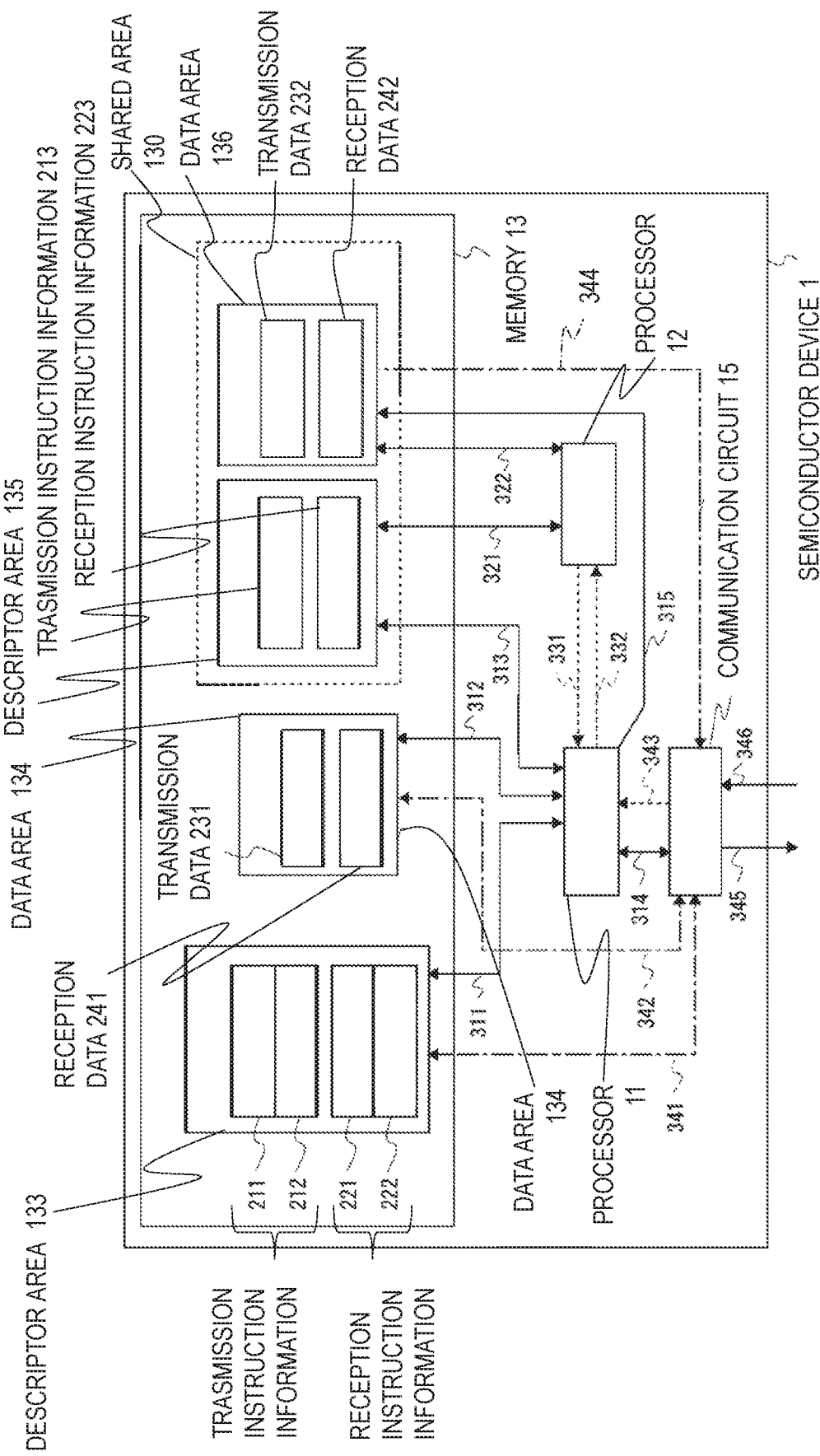
FIG. 2 is a functional block diagram illustrating a configuration of a semiconductor device according to the embodiment 1.

FIG. 2 is a functional diagram showing the configuration of the semiconductor device 1 according to the present embodiment 1. The same components as those in FIG. 1 are denoted by the same reference numerals. In FIG. 2, the interrupt controller 14 and the OS 131 and 132 and other data in the memory 13 are omitted. The memory 13 includes a descriptor area 133, a data area 134, a descriptor area 135, and a data area 136.

The descriptor area 133 and the data area 134 are working areas of the OS 131 executed by the processor 11. That is, the descriptor area 133 and the data area 134 are structures on the virtual space of the processor 11. It is assumed that the descriptor area 133 and the data area 134 do not accept access from the processor 12. The descriptor area 133 is an exemplary first descriptor area and is a storage area for storing one or more descriptors for causing the communication circuit 15 to transmit and receive data to and from the outside by the OS 131. Here, the descriptor includes transmission instruction information used at the time of transmission and reception instruction information used at the time of reception. The descriptor area 133 can store a plurality of pieces of transmission instruction information 211, 212, . . . , and a plurality of pieces of reception instruction information 221, 222, . . . . The descriptor area 133 can independently manage the transmission instruction information and the reception instruction information. Here, the transmission instruction information 211 and the like include, for example, a physical address (e.g., a start address) on the memory 13 in which the transmission data is stored, a size of the transmission data, a status area for recording a DMA transfer completion state (transmission completion information), and the like. The reception instruction information 222 and the like include, for example, a physical address (e.g., a start address) on the memory 13 for storing the reception data, a size of the reception data, a status area for recording a DMA transfer completion state (reception completion information), and the like. As the format of the descriptor, for example, a known format described in Japanese unexamined Patent Application publication No. 2009-187313 or the like may be used. In addition, the descriptor area 133 can hold a descriptor for the OS 131 and a descriptor for the OS 132 in a mixed manner.

The data area 134 is an exemplary first data area and is a storage area for storing the transmission data 231 and the reception data 241, which are objects of the data transmission/reception process with the outside by the OS 131. In the present embodiment, the reception data 241 may be data received from the outside toward the OS 132. The data area 134 can store two or more pieces of transmission data and two or more pieces of reception data.

The descriptor area 135 and the data area 136 are working areas of the OS 132 executed by the processor 12. That is, the descriptor area 135 and the data area 136 are structures on the virtual space of the processor 12. However, it is assumed that the descriptor area 135 and the data area 136 are also accessible from the processor 11. That is, the descriptor area 135 and the data area 136 are shared areas 130 that can be accessed by the processor 11 in which the OS 131 operates and the processor 12 in which the OS 132 operates. The descriptor area 135 is an exemplary second descriptor area and is a storage area for storing one or more descriptors for causing the communication circuit 15 to transmit and receive data to and from the outside for the OS 132. The descriptor area 135 can store one or more pieces of transmission instruction information 213 and one or more pieces of reception instruction information 223. The descriptor area 135 can independently manage the transmission instruction information and the reception instruction information. The address included in the transmission instruction information 213 and the reception instruction information 223 is an address in the data area 136 managed by the OS 132.

The data area 136 is an exemplary second data area and is a storage area for storing the transmission data 232 and the reception data 242, which are objects of the data transmission/reception process with the outside by the OS 132. The data area 136 can store two or more pieces of transmission data and two or more pieces of reception data.

The processor 11 reads and writes data from and to the descriptor area 133, the data area 134, the descriptor area 135, and the data area 136 by data accesses 311, 312, 313, and 315, respectively. In addition, the processor 11 transmits and receives notifications to and from the communication circuit 15 through a data access 314. The processor 11 receives a completion notification from the communication circuit 15 by a completion interrupt 343. The processor 11 performs inter-OS communication with the processor 12 via the interrupt controller 14 by IPI interrupts 331 and 332.

The processor 12 reads and writes data from and to the descriptor area 135 and the data area 136 by data accesses 321 and 322, respectively. When data is transmitted and received via the communication circuit 15, the processor 12 notifies the processor 11 of the transmission instruction or reception instruction by the IPI interrupt 331. The processor 12 also receives the notification by the IPI interrupt 332 from the processor 11 when the data to the processor 12 itself is received by the communication circuit 15.

The communication circuit 15 reads and writes data from and to the descriptor area 133, the data area 134, and the data area 136 by data accesses 341, 342, and 344, respectively. When the transmission instruction is received from the processor 11 by the data access 314, the communication circuit 15 refers to the transmission instruction information 211 in the descriptor area 133 and performs the transmission process of the transmission data 231 or 232 by the data output 345. When the reception instruction is received by the data access 314 from the processor 11, the communication circuit 15 refers to the reception instruction information 221 in the descriptor area 133 and performs the reception process of the reception data 241 by the data input 346.

Figure 3:
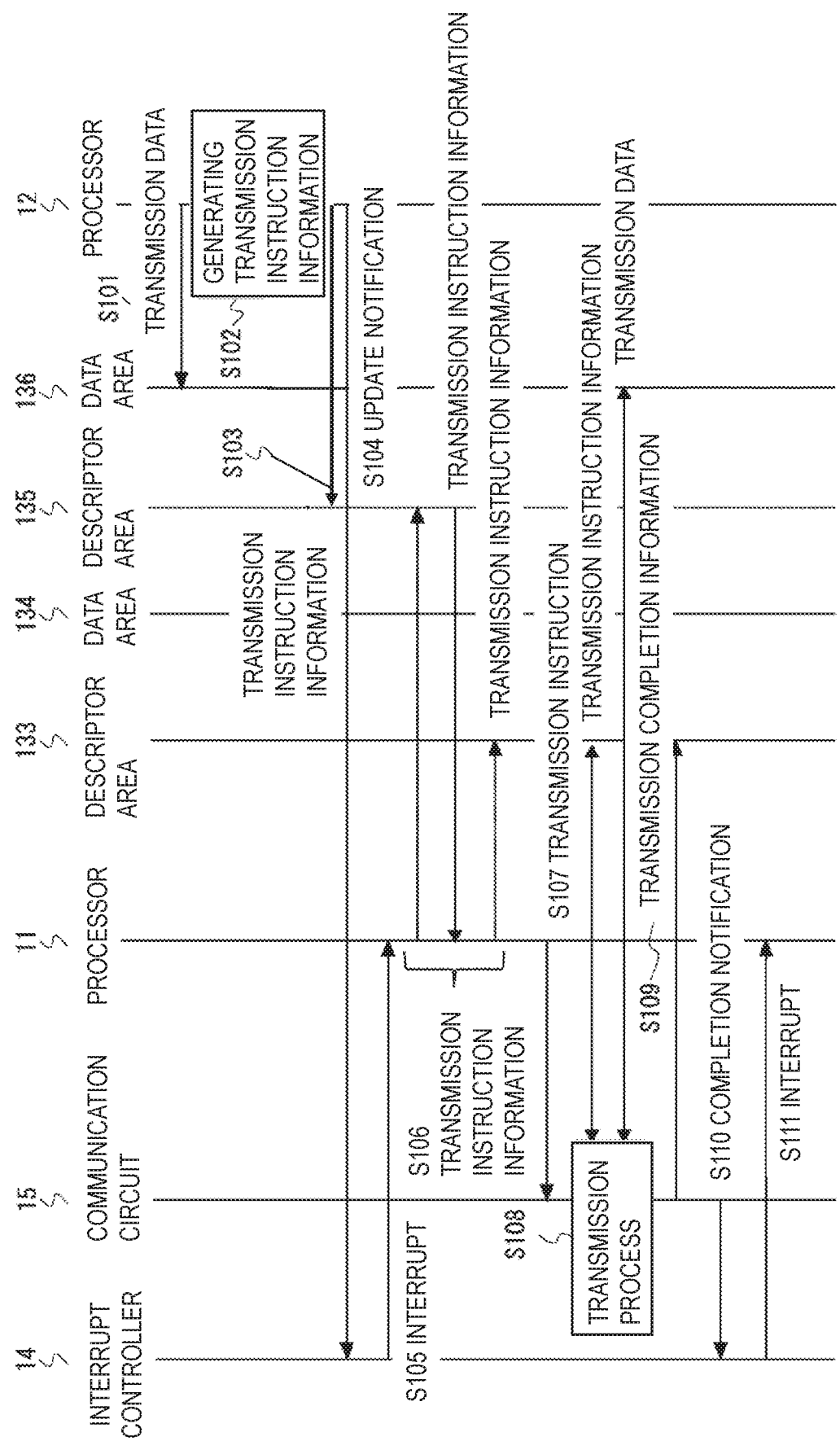
FIG. 3 is a sequence diagram showing a flow of a data transmission process according to the embodiment 1.
Figure 4:
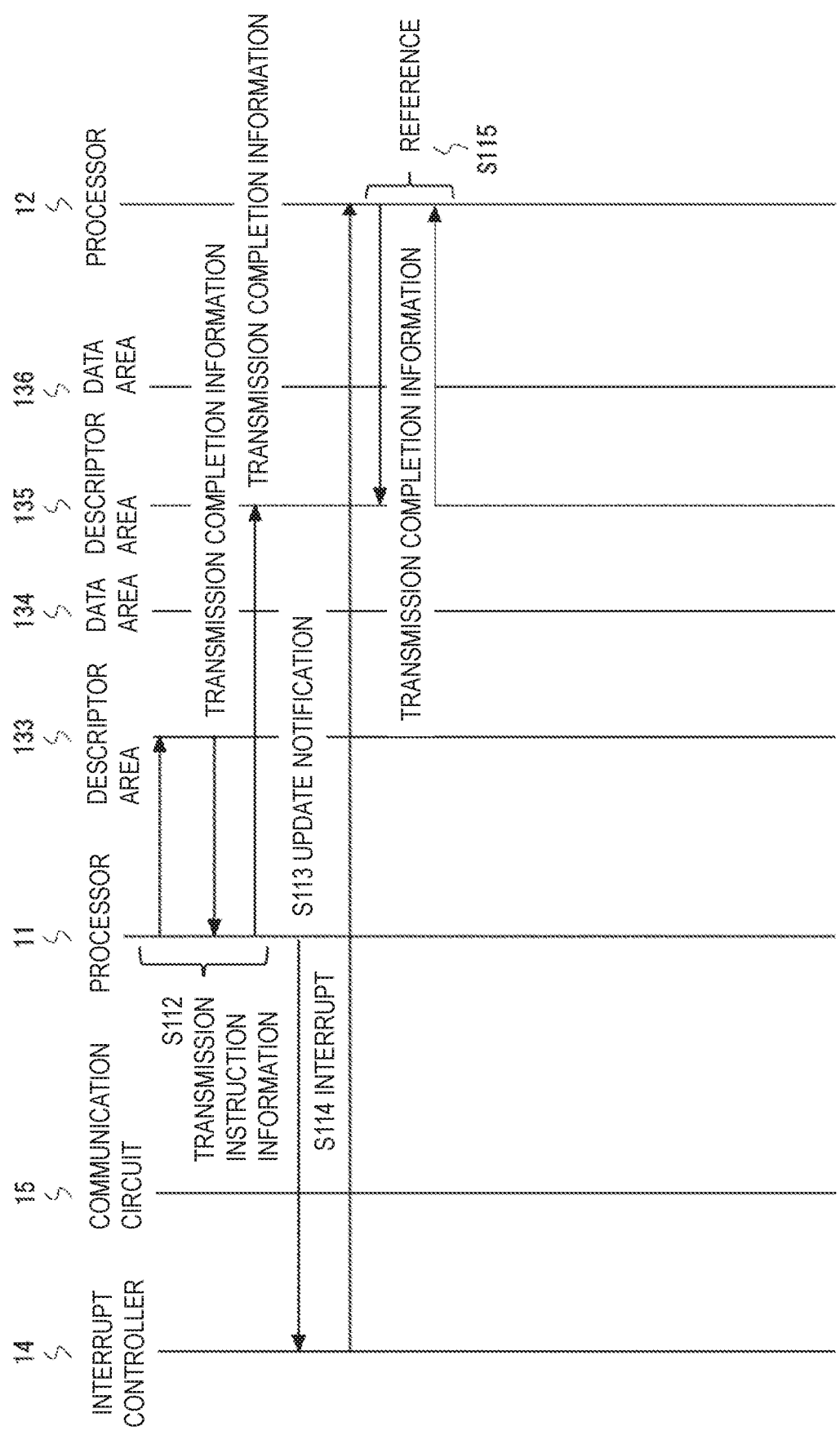
FIG. 4 is a sequence diagram showing the flow of a data transmission process according to the embodiment 1.

FIG. 3 and FIG. 4 are sequence diagrams showing the flow of the data transmission process performed by the present embodiment 1. First, the processor 12 creates transmission data 232 to be transmitted to the communication network N via the communication circuit 15 and stores the transmission data 232 in the data area 136 by the data access 322 (S101). Next, the processor 12 generates transmission instruction data 213 as a descriptor for transmitting the transmission data 232 to the communication circuit 15 (S102). Then, the processor 12 stores the transmission instruction information 213 in the descriptor area 135 by the data access 321 (S103). Thereafter, the processor 12 notifies the processor 11 of the update of the descriptor area 135 by the IPI interrupt 331. Specifically, the processor 12 transmits an update notification to the interrupt controller 14 via the interrupt signal line 17 (S104). In response to the update notification from the processor 12, the interrupt controller 14 outputs an interrupt signal to the processor 11 via the interrupt signal line 17 (S105).

Then, the processor 11 reads the transmission instruction information 213 from the descriptor area 135 by the data access 313 in response to the update notification by the IPI interrupt 331 (an interrupt signal from the interrupt controller 14, hereinafter the same). Then, the processor 11 stores, i.e., S106, the read transmission instruction information 213 as the transmission instruction information 211 in the descriptor area 133 by the data access 311. Thereafter, the processor 11 notifies the communication circuit 15 of the transmission instruction by the data access 314 (S107).

In response to a transmission instruction from the processor 11, the communication circuit 15 reads out the transmission instruction information 211 from the descriptor area 133 by the data access 341. Since the read transmission instruction information 211 indicates the transmission data 232 in the data area 136, the communication circuit 15 reads the transmission data 232 from the data area 136 by the data access 344, and transmits the transmission data 232 to the communication network N by the data output 345 by DMA transfer (S108). Thereafter, the communication circuit 15 records (adds) the transmission completion information, which is the result of the DMA process, in the transmission instruction information 211 in the descriptor area 133 by the data access circuit 341 (S109). Then, the communication circuit 15 notifies the processor 11 of the completion by the completion interrupt 343. Specifically, the communication circuit 15 transmits a completion notification to the interrupt controller 14 via the interrupt signal line 17 (S110). In response to the completion notification from the communication circuit 15, the interrupt controller 14 outputs an interrupt signal to the processor 11 via the interrupt signal line 17 (S111).

In response to the completion notification by the completion interrupt 343, the processor 11 reads the transmission instruction information 211 (transmission completion information) from the descriptor area 133 by the data access 311, and stores it in the descriptor area 135 by the data access 313, that is, updates or copies the transmission instruction information 213 (transmission completion information) (S112). Then, the processor 11 transmits an update notification of the descriptor area 135 to the processor 12 by the IPI interrupt 332. Specifically, the processor 11 transmits an update notification to the interrupt controller 14 via the interrupt signal line 17 (S113). In response to the update notification from the processor 11, the interrupt controller 14 outputs an interrupt signal to the processor 12 via the interrupt signal line 17 (S114).

Then, in response to the update notification by the IPI interrupt 332, the processor 12 reads the transmission instruction information 213 in the descriptor area 135 by the data access 321 and refers to the transmission result (transmission completion information) (S115).

As described above, most of the processing of transmission to the communication network N in the OS 132 can be shared only by changing a part of the processing of transmission to the communication network N in the OS 131 of directly controlling the communication circuit 15. That is, the transmission process to the communication network N in the OS 132 is replaced with the transmission process of the update notification of the descriptor area 135 by the IPI interrupt 331 to the processor 11, instead of the transmission instruction to the communication network 15. In addition, the process of transmission data to the communication network N in the OS 132 is replaced with a process of receiving a notification of updating the descriptor area 135 from the processor 11 by the IPI interrupt 332, instead of a process of receiving a notification of completion from the communication circuit 15. No other processing changes are necessary.

Figure 5:
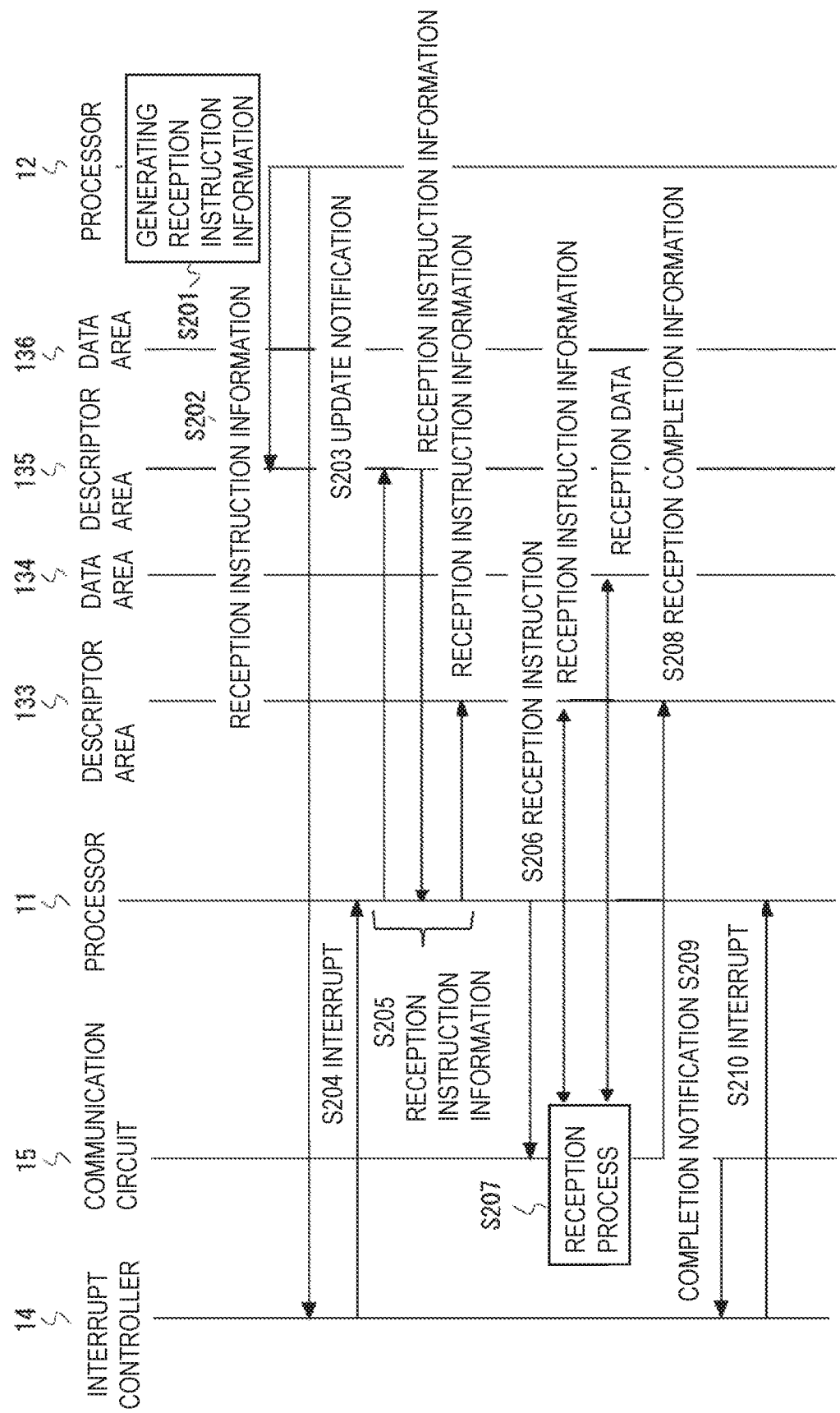
FIG. 5 is a sequence diagram showing a flow of the data reception process according to the embodiment 1.
Figure 6:
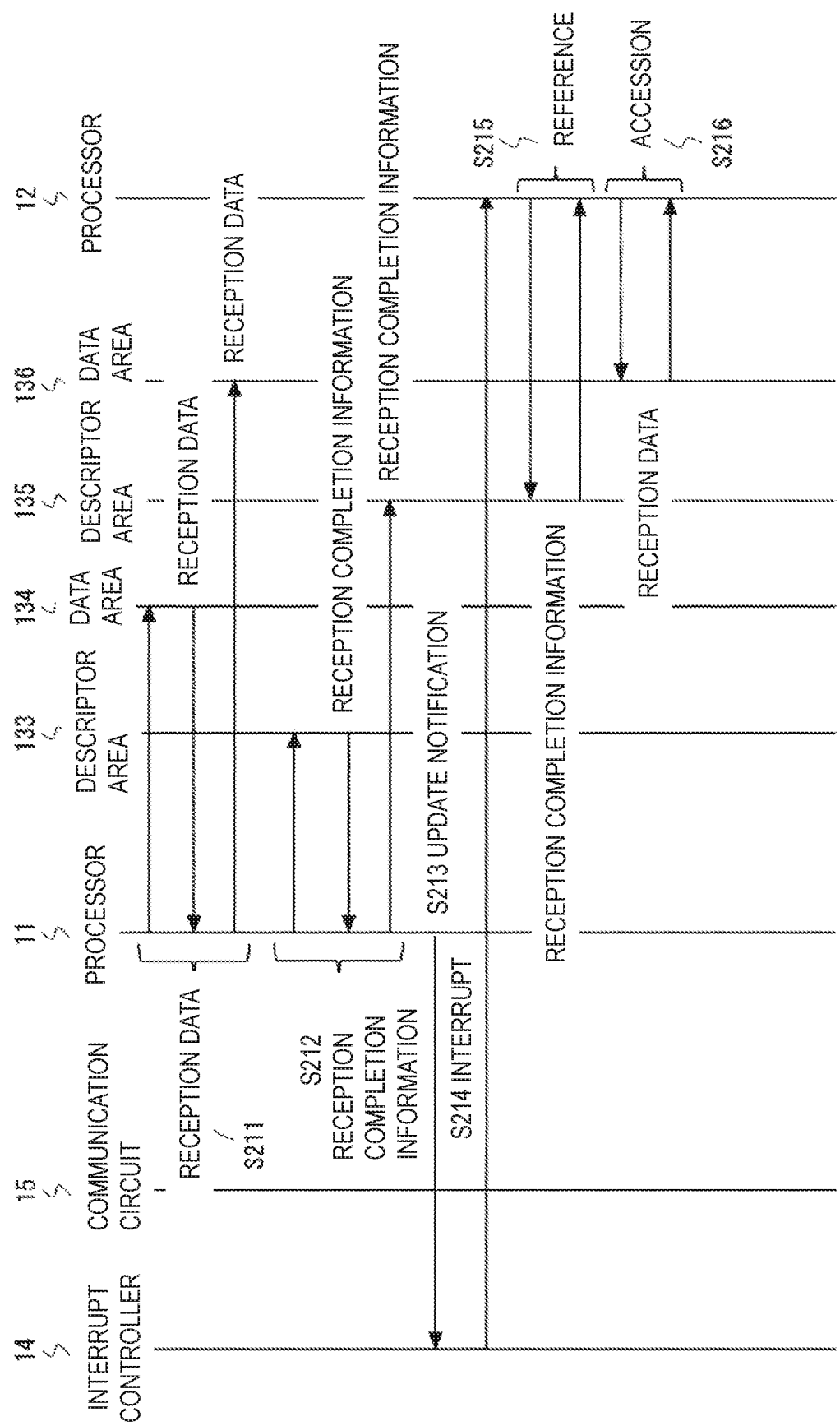
FIG. 6 is a sequence diagram showing the flow of the data reception process according to the embodiment 1.

FIG. 5 and FIG. 6 are sequence diagrams showing the flow of the data reception process performed by the present embodiment 1. First, the processor 12 generates reception instruction data 223 as a descriptor for causing the communication circuit 15 to receive data transmitted from the communication networks N (S201). Then, the processor 12 stores the reception instruction data 223 in the descriptor area 135 by the data access 321 (S202). Thereafter, the processor 12 notifies the processor 11 of the updating of the descriptor area 135 by the IPI interrupt 331 (S203 and S204). The specific process is the same as the above-described steps S104 and S105.

In response to the update notification by the IPI interrupt 331, the processor 11 reads the reception instruction information 223 from the descriptor area 135 by the data access 313. Then, the processor 11 stores, i.e., S205, the read reception instruction information 223 as the reception instruction information 221 in the descriptor area 133 by the data access 311. However, since the address included in the reception instruction information 223 is an address in the data area 136, the processor 11 may change the address to an address in the data area 134 when storing the reception instruction information 221. Thereafter, the processor 11 notifies the communication circuit 15 of a reception instruction indicating that the reception of the Ethernet packets is completed by the data access 314 (S206).

In response to a reception instruction from the processor 11, the communication circuit 15 refers to the reception instruction information 221 in the descriptor area 133 by the data access 341 and receives data from the communication network N by the data input 346. After receiving the data, the communication circuit 15 stores the reception data 241 in the data area 134 by the data access unit 342 based on the reception instruction data 221 (S207). Then, the communication circuit 15 records (adds) the reception completion information, which is the result of the DMA process, in the reception instruction information 221 in the descriptor area 133 by the data access circuit 341 (S208). Then, the communication circuit 15 notifies the processor 11 of the completion notification by the completion interrupt 343 (S209 and S210).

In response to the completion notification by the completion interrupt 343, the processor 11 reads data from the reception data 241 in the data area 134 by the data access 342, and if the reception data 241 is data for the OS 132 or the processor 12, the processor 11 stores, i.e., copies (S211) the data as the reception data 242 in the data area 136 by the data access 315. In the Ethernet communication, the destination of the communication data is determined by the destination addresses included in the headers of the frame data as the reception data. Then, the processor 11 reads out the reception instruction information corresponding to the copied data from the reception instruction information 221 in the descriptor area 133 by the data access 311, and stores, that is, copies (S212) the reception instruction information as the reception instruction information 223 in the descriptor area 135 by the data access 313. However, since the address included in the reception instruction information 221 is an address in the data area 134, the processor 11 may change the address to an address in the data area 135 when storing the reception instruction information 223. Then, the processor 11 transmits an update notification of the descriptor area 135 to the processor 12 in response to the IPI interrupt 332 (S213 and S214).

Then, in response to the update notification by the IPI interrupt 332, the processor 12 reads the reception instruction information 223 in the descriptor area 135 by the data access 321 and refers to the reception result (reception completion information) (S215). Then, the processor 12 acquires the reception data 242 from the data area 136 by the data access 322 and performs S216 as appropriate.

As described above, most of the processing of receiving from the communication network N in the OS 132 can be shared only by changing a part of the processing of receiving from the communication network N in the OS 131 of directly controlling the communication circuit 15. That is, the reception process from the communication network N in the OS 132 is replaced with the transmission process of the update notification of the descriptor area 135 by the IPI interrupt 331 to the processor 11, instead of the reception instruction to the communication circuit 15. Further, the reception process from the communication network N in the OS 132 is replaced with the reception process of the update notification of the descriptor area 135 by the IPI interrupt 332 from the processor 11, instead of the reception process of the completion notification from the communication network 15. No other processing changes are necessary.

In the related art described above, the processor 91 copies the transmission data 232 in the virtual space (shared area 936) of the processor 92 into its own virtual space (data area 134) by inter-OS communication. However, in the present embodiment, it is possible to reduce the copy processing of the transmission data associated with the inter-OS communication. If the effect is the smallest, that is, even if the size of the transmission data is the smallest, the effect is obtained. That is, even when the transmission data has the smallest frame size of 64 bytes and the descriptor size is 8 byte, the copying process of the transmission data can be reduced to 8/(64+8)*100=11.1%. In addition, the data can be transmitted while the transmission data 232 remains in the data area 136 of another space which is not managed by the OS 131.

In addition, in the related art, it is necessary to implement processing that is largely different from the communication processing on the processor 91 side and the communication processing on the processor 92 side. However, in the present embodiment, as described above, since the descriptor structure is also used on the processor 12 side, it can be realized by processing which is largely common to the processor 11 side. Therefore, the development efficiency is improved.

Further, in the present embodiment, the processor 11 can improve security by checking whether or not the address indicated by the descriptor indicates the address in the data area 136 when copying the descriptor such as the S106 of steps or the S205.

Another Embodiment of the Embodiment 1

Here, another Embodiment of the present embodiment will be described. In another Embodiment, a plurality of descriptors is copied collectively. That is, it is preferable that the second processor stores two or more pieces of the first transmission instruction information corresponding to each of two or more pieces of the transmission data stored in the second data area in the second descriptor area, and transmits the first update notification when two or more pieces of the first transmission instruction information are stored in the second descriptor area. In this case, in response to the first update notification, the first processor stores each first transmission instruction information in the first descriptor area in accordance with the storage order of two or more pieces of the first transmission instruction information stored in the second descriptor area. Then, the communication circuit performs transmission process of the transmission data corresponding to each first transmission instruction information stored in the second data area according to the storage order of two or more pieces of the first transmission instruction information stored in the first descriptor area. In this manner, two or more pieces of communication instruction information can be collected to reduce the frequency of IPI communication, and the processing load of the processor can be further reduced.

Figure 7:
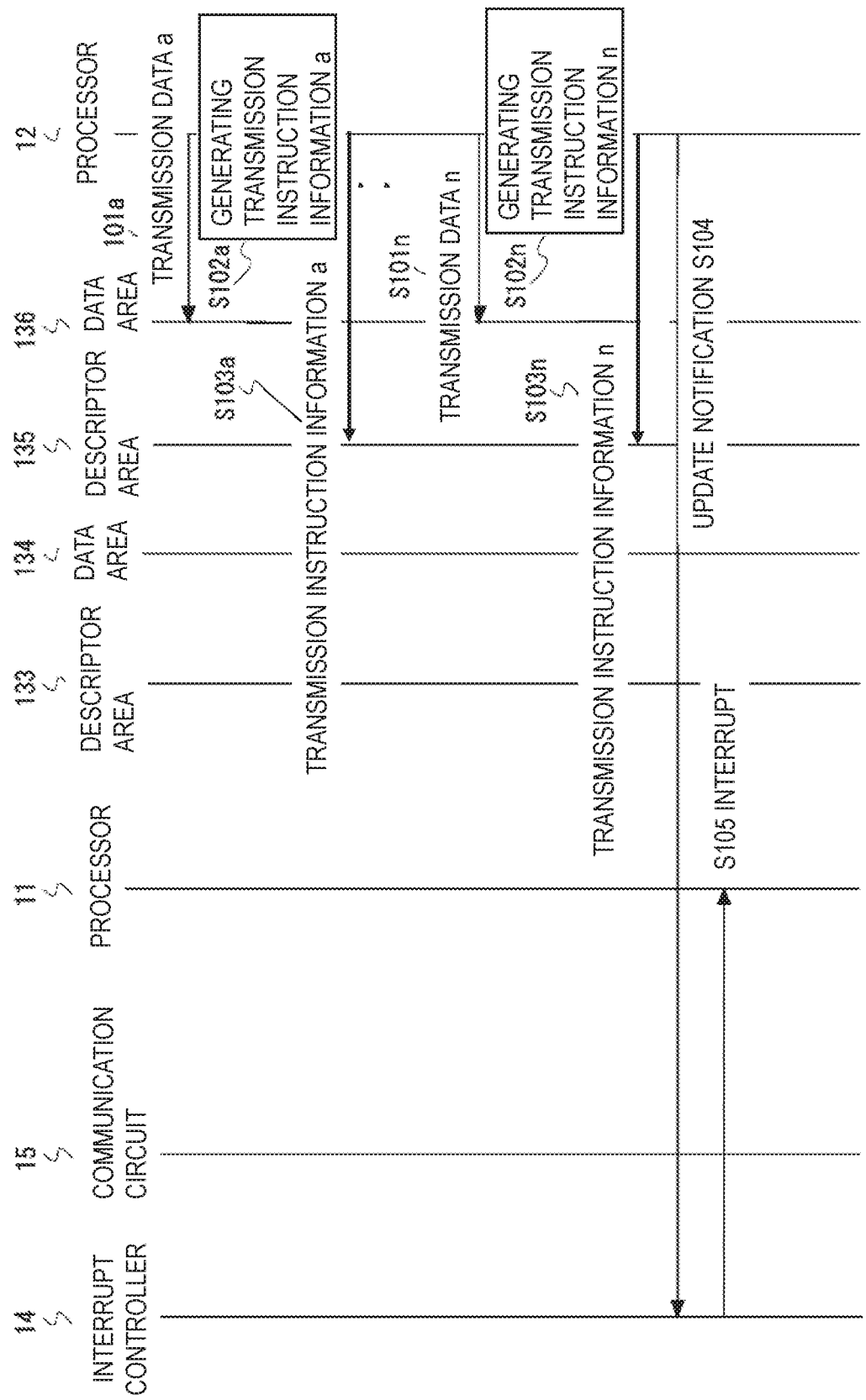
FIG. 7 is a sequence diagram showing the flow of data transmission process (bulk copies of multiple descriptors) in accordance with the embodiment 1.
Figure 8:
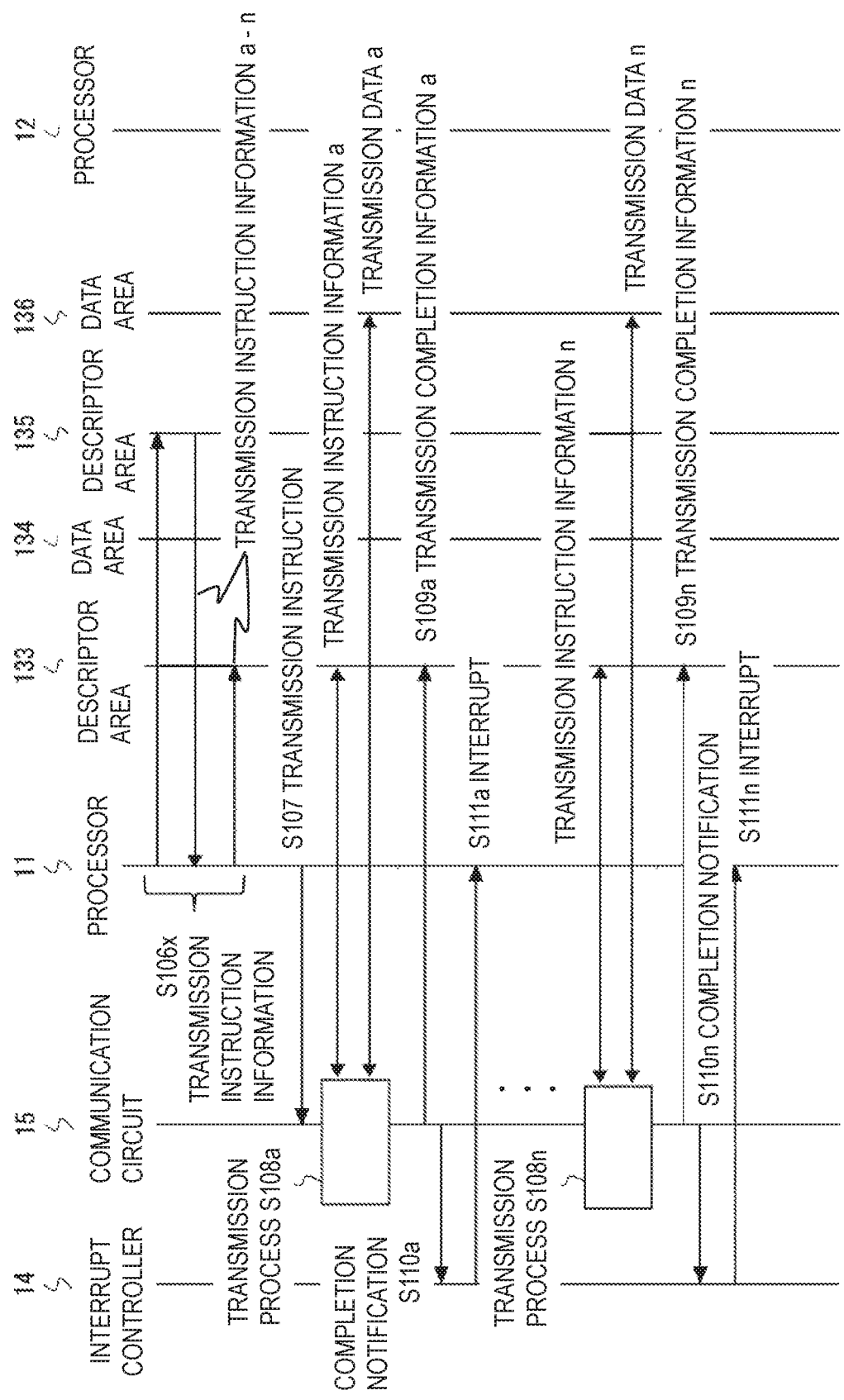
FIG. 8 is a sequence diagram showing the flow of data transmission process (bulk copies of multiple descriptors) in accordance with the embodiment 1.
Figure 9:
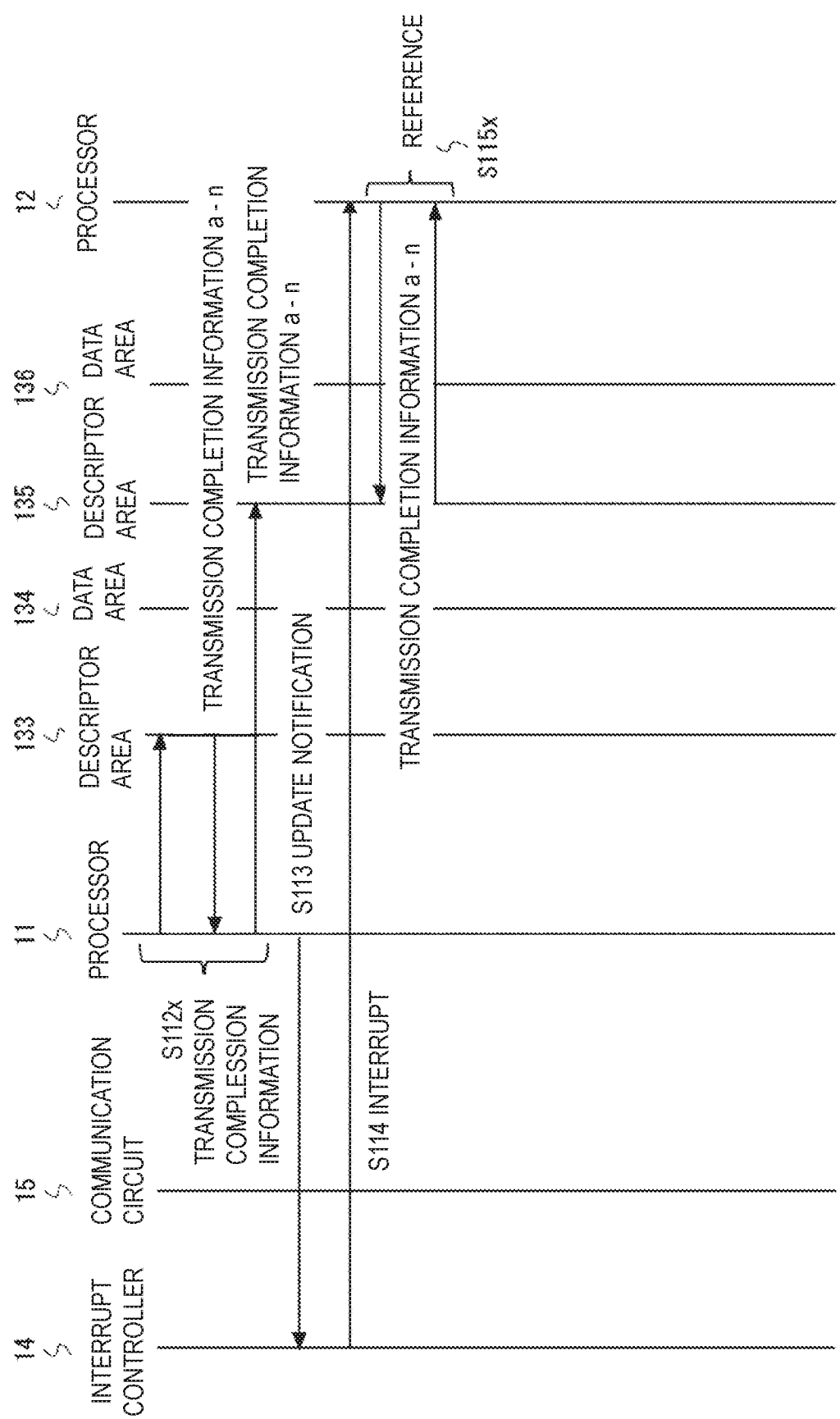
FIG. 9 is a sequence diagram showing the flow of data transmission process (bulk copies of multiple descriptors) in accordance with the embodiment 1.

FIG. 7, FIG. 8, and FIG. 9 are sequence diagrams showing a flow of a data transmission process (collective copying of a plurality of descriptors) according to the present embodiment 1. The same applies to the data reception process, and the same effect can be obtained, so that the illustration and detailed description are omitted.

First, the processor 12 creates first transmission data 232a to be transmitted to the communication network N via the communication circuit 15 and stores the transmission data 232a in the data area 136 by the data access 322 in the same manner as in the S101 of steps (S101a). Next, the processor 12 generates the transmission instruction data 213a as a descriptor for transmitting the transmission data 232a to the communication circuit 15 in the same manner as in the step S102 (S102a). Then, the processor 12 stores the transmission instruction information 213a in the descriptor area 135 by the data access 321 in the same manner as in the step S103 (S103a). Thereafter, the second case (transmission data 232b, transmission instruction information 213b) and the subsequent cases are similarly performed up to the n-th case (transmission data 232n, transmission instruction information 213n) (S101n, S102n, and S103n). That is, at this time, n pieces of transmission data are stored in the data area 136, and n pieces of transmission instruction information are stored in the descriptor area 135 in the order of a to n.

Subsequently, the processor 12 notifies the processor 11 of the updating of the descriptor area 135 by the IPI interrupt 331 (S104 and S105). In response to the update notification by the IPI interrupt 331, the processor 11 reads n pieces of transmission instruction information 213a to 213n from the descriptor area 135 by the data access 313. Then, the processor 11 stores, i.e., copies (S106x) the read n pieces of transmission instruction information 213a to 213n as n pieces of transmission instruction information 211a to 211 n in the descriptor area 133 according to the storage order in the descriptor area 135 by the data access 311. Thereafter, the processor 11 notifies the communication circuit 15 of the transmission instruction by the data access 314 (S107).

In response to a transmission instruction from the processor 11, the communication circuit 15 transmits the transmission data in the data area 136 in accordance with the order in which the n pieces of transmission instruction information 211a to 211n in the descriptor area 133 are stored. More specifically, the communication circuit 15 reads out the transmission data 232a stored in the first data area 136 by the data access 344 based on the transmission instruction information 211a stored in the first data area in the descriptor area 133. Then, the communication circuit 15 transmits the read transmission data 232 to the communication network N by the data output circuit 345 (S108a). Thereafter, the communication circuit 15 records the transmission completion information a in the transmission instruction information 211a in the descriptor area 133 (S109a) and notifies the processor 11 of the completion by the completion interrupt 343 (S110a and S111a). The second and subsequent cases are similarly performed up to the n-th (transmission data 232n, transmission instruction data 211n) (S108n, S109n, S110n, and S111n).

In response to the n-th completion notification by the completion interrupt 343, the processor 11 reads n pieces of transmission instruction information 211a-211n (transmission completion information 211a-211n) from the descriptor area 133 by the data access 311 and stores them in the descriptor area 135 by the data access 313 (S112x). Then, the processor 11 transmits an update notification of the descriptor area 135 to the processor 12 in response to the IPI interrupt 332 (S113 and S114).

Then, in response to the update notification by the IPI interrupt 332, the processor 12 reads out the n pieces of transmission instruction information 213a-213n in the descriptor area 135 by the data access 321 and refers to the n pieces of transmission results (transmission completion information a-n) (S115x).

In the related art described above, inter-OS communication of a set of IPI interrupts 931 and 932 occurs for each Ethernet frame. For example, when there are requests to transmit three Ethernet frames, three IPIs are exchanged, that is, a total of six IPIs are generated. On the other hand, in the above-described other Embodiment of the present embodiment, when there are three requests to transmit three Ethernet frames, three descriptors are copied at a time, so that the inter-OS communication can be reduced to two IPI interrupts 331 and 332. If one communication is the smallest frame size of 64 bytes in the Gigabit Ethernet, 1488000 communications occur per second. If a processing time of 1 us (microsecond) is required only for response processing to one interrupt, the related art requires a processing time of 1488000*2*1 us=2.976 s. However, since the processing time exceeds 1 second, the processing does not catch up. On the other hand, in the above-described other Embodiment of the present embodiment, the processing time can be reduced to the processing time of 2.976 s/3=0.992 s, and the processing can be performed. Incidentally, the three Ethernet frames are grouped together as examples, and the process time can be further reduced by increasing the number of descriptors to be copied at a time.

Embodiment 2

Embodiment 2 is another Embodiment of Embodiment 1 or an improvement of Embodiment 1. In the first embodiment, the processor 11 copies the reception data addressed to the processor 12 from the data area 134 to the data area 136, and there is room for reducing the processing load of the processor. In the Ethernet communication, the destination of the communication data is determined by the destination addresses included in the headers of the frame data. Frame data is needed to be analyzed. However, although the processor can analyze the header of the frame data after being stored in the memory, it cannot determine and allocate the data area of the storage destination before being stored during DMA transfer. Therefore, in order to distribute the data area of the storage destination of the reception data from the communication network N according to the destination, it is conceivable that the communication circuit determines the destination at the time of receiving the data.

Therefore, the semiconductor device according to the second embodiment is improved to the first embodiment, and the communication circuit stores the reception data in the second data area, stores the reception completion information in the first descriptor area, and transmits a completion notification of the reception process to the first processor when the destination of the reception data indicates the second operating system. As a result, it is possible to reduce the copy processing of the reception data and further reduce the processing load of the processor.

Further, it is preferable that the first descriptor area includes a first sub area corresponding to the first data area and a second sub area corresponding to the second data area. In this case, the first processor stores the first reception instruction information in the second sub area in response to the third update notification. The communication circuit may retain first communication address information corresponding to the first OS and second communication address information corresponding to the second OS, determine whether or not each of the first and second communication address information is included in the destination of the reception data, and store the reception data in the second data area when it is determined that the second communication address information is included in the destination. In this manner, by dividing the first descriptor area into two sub-areas and separately managing the instruction information, the storage destination can be specified according to the address information for each OS, and multicast can be handled.

Further, the communication circuit may include a first classifier accessible to the first data area and the first sub-area, and a second classifier accessible to the second data area and the second sub-area. In this case, the communication circuit inputs the reception data to claim of the first classifier and the second classifier. In particular, when it is determined that the second communication address information is included in the destination, the second classifier specifies the second data area as the storage destination based on the first reception instruction information stored in the second sub-area and stores the reception data in the second data area. As a result, the storage destination can be specified according to the address information for each OS, and distribution becomes efficient.

It should be noted that Embodiment 2 is not premised on Embodiment 1 described above and may have a single configuration. In this instance, the semiconductor device according to the second embodiment includes a first processor and a second processor that execute Operating System differing from each other, the memory, and a communication circuit controlled by the first processor. The memory includes a first descriptor area and a first data area, which are work areas of a first OS executed by the first processor, and a second descriptor area and a second data area, which are work areas of a second OS executed by the second processor. Here, the second processor stores first reception instruction information for storing reception data in the second data area in the second descriptor area and transmits a third update notification of the second descriptor area to the first processor. In response to the third update notification, the first processor reads the reception instruction information stored in the second descriptor area and stores the reception instruction information in the first descriptor area. Here, the first descriptor area includes a first sub area corresponding to the first data area and a second sub area corresponding to the second data area. The first processor stores the first reception instruction information read from the second descriptor area in the second sub area in response to the third update notification. The communication circuit holds first communication address information corresponding to the first OS or the first processor and second communication address information corresponding to the second OS and the second processor. The communication circuit determines whether each of the first and second communication address information is included in the destination of the reception data and stores the reception data in the second data area when it is determined that the second communication address information is included in the destination. Even in this manner, it is possible to reduce the processing load of the processor by reducing the copying processing of the reception data as compared with the related art. Further, similarly to the first embodiment, the development efficiency can be improved.

Figure 10:
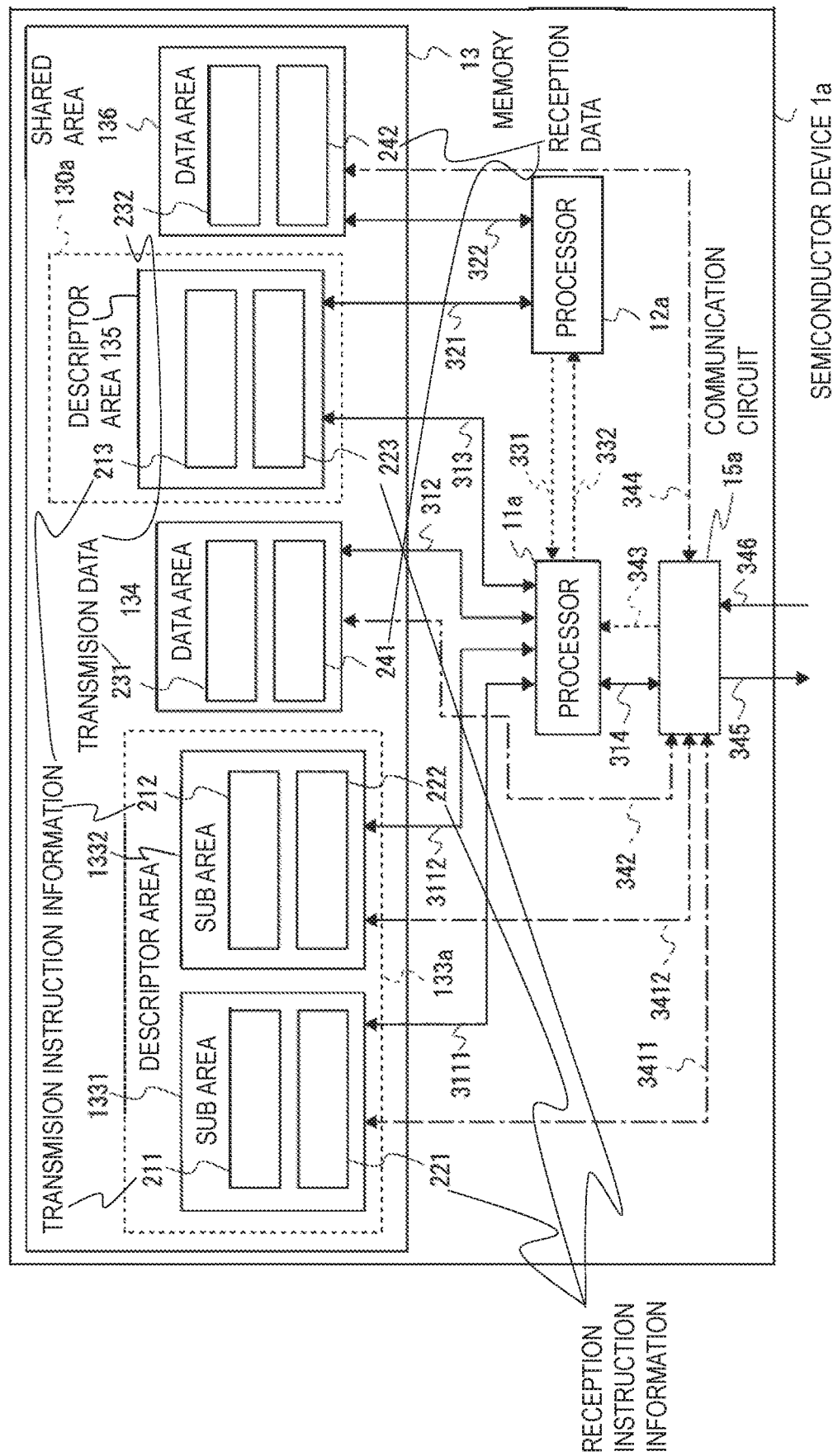
FIG. 10 is a functional block diagram illustrating a configuration of a semiconductor device according to embodiment 2.

Here, since the hardware configuration of the second embodiment is the same as that of FIG. 1, illustration and description thereof are omitted. Next, FIG. 10 is a functional diagram showing the configuration of a semiconductor device 1a according to the present second embodiment. The semiconductor device 1a is obtained by changing the configuration of a part of the semiconductor device 1 described above. That is, in the semiconductor device 1a, the descriptor area 133 in the memory 13 of the semiconductor device 1 is replaced with a descriptor area 133a including sub-areas 1331 and 1332. In the semiconductor device 1a, the processors 11 and 12 and the communication circuit 15 of the semiconductor device 1 are replaced with processors 11a and 12a and a communication circuit 15a. Further, the descriptor area 135 is a shared area 130a that can be accessed by each of the processor 11a in which the OS 131 operates and the processor 12a in which the OS 132 operates. The same components as those in FIG. 2 are denoted by the same reference numerals, and a description thereof is omitted.

The sub-area 1331 is a descriptor area corresponding to the data area 134 managed by the OS 131 and is an exemplary first sub-area. The sub-area 1332 is a descriptor area corresponding to the data area 136 managed by the OS 132 and is an exemplary second sub-area. Therefore, in the second embodiment, the descriptor for the OS 131 and the descriptor for the OS 132 are managed independently without being mixed. The sub area 1331 stores the transmission instruction information 211 and the reception instruction information 221. That is, the transmission instruction information 211 and the reception instruction information 221 are processed by the OS 131. The sub area 1332 stores the transmission instruction information 212 and the reception instruction information 222 and corresponds to the transmission instruction information 213 and the reception instruction information 223 in the descriptor area 135. Unlike the first embodiment, the data area 136 does not accept access from the processor 11a.

The processor 11a read and write data from and to the sub-areas 1331 and 1332 by data accesses 3111 and 3112, respectively. In particular, the processor 11a copies the descriptor between the descriptor area 135 and the sub-area 1332.

When the destination of the reception data from the communication network N indicates the OS 132 or the processor 12a, the communication circuit 15a directly stores the reception data 242 in the data area 136, stores the reception completion information in the descriptor area 133a, and transmits a completion notification of the reception process to the processor 11a. Further, the communication circuit 15a maintains the first communication address information corresponding to the OS 131 or the processor 11a and the second communication address information corresponding to the OS 132 or the processor 12a, determines whether or not the destination of the reception data includes the first and second communication address information, and stores the reception data in the data area 136 when it is determined that the destination includes the second communication address information.

Figure 11:
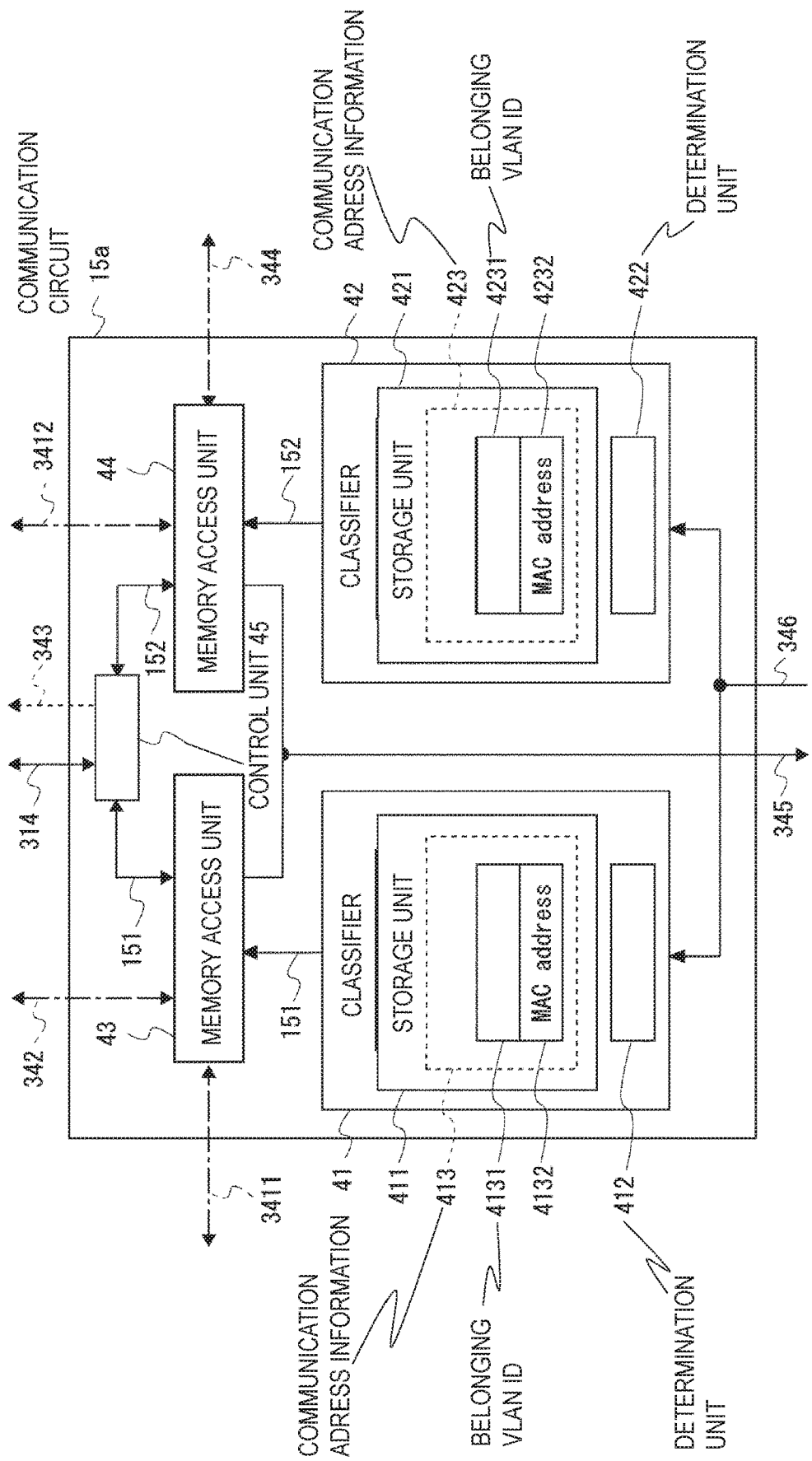
FIG. 11 is a block diagram showing an internal configuration of a communication circuit according to the embodiment 2.

FIG. 11 is a functional block diagram showing the internal configuration of the communication circuit 15a according to the present second embodiment. The communication circuit 15a includes classifiers 41 and 42, memory access units 43 and 44, and a control unit 45. However, the communication circuit 15a may have another configuration other than the two classifiers. That is, the communication circuit 15a is equipped with at least a plurality of reception DMA channels, and has each classifier as each reception DMA channel. Therefore, the number of classifiers may be three or more.

The classifier 41 is accessible to the data area 134 and the sub-area 1331. Classifier 42 is accessible to data area 136 and sub-area 1332. The communication circuit 15a inputs the reception data received by the data input 346 from the communication network N to each of the classifiers 41 and 42.

The classifier 41 includes a storage unit 411 and a determination unit 412. The storage unit 411 stores in advance a communication address information 413 indicating the OS 131 or the processor 11a. The communication address information 413 is, for example, but is not limited to, a belonging VLAN ID 4131 to which it belongs and a MAC address 4132. A determination unit 412 determines whether or not the communication address information 413 is included in the destination of the input reception data, and when it is determined to be included, outputs the reception data and the determination result to a memory access unit 43 as it is necessary to receive the determination result. On the other hand, when the communication address information 413 indicating the OS 131 or the processor 11a is not included in the destination address, the determination unit 412 discards the reception data, determines that the determination result does not need to be received, and outputs the determination result to the memory access unit 43.

The memory access unit 43 processes the DMA transfer. Specifically, the memory access unit 43 can access the sub-area 1331 by the data access 3411 and can access the data area 134 by the data access 342. In response to the transmission instruction from the control unit 45, the memory access unit 43 refers to the sub-area 1331 and transmits the transmission data in the data area 134 to the communication network N by the data output 345. When the determination results from the classifier 41 indicates that reception is necessary, the memory access unit 43 refers to the sub-area 1331 and stores the reception data in the data area 134.

The classifier 42 includes a storage unit 421 and a determination unit 422. The storage unit 421 stores in advance a communication address information 423 indicating the OS 132 or the processor 12a. A communication address information 423 is, for example, but is not limited to, a belonging VLAN ID 4231 to which it belongs and a MAC address 4232. The determination unit 422 determines whether or not a communication address information 423 is included in the destination of the input reception data, and when it is determined that it is included, outputs the reception data and the determination result to the memory access unit 44 as requiring reception. On the other hand, when the communication address information 423 indicating the OS 132 or the processor 12a is not included in the destination address, the determination unit 422 discards the reception data, determines that the determination result does not need to be received, and outputs the determination result to the memory accessing unit 44.

The memory access unit 44 processes the DMA transfer. Specifically, the memory access unit 44 can access the sub-area 1332 by a data access 3412 and can access the data area 136 by the data access 344. In response to the transmission instruction from the control unit 45, the memory access unit 44 refers to the sub-area 1332 and transmits the transmission data in the data area 136 to the communication network N by the data output 345. When the determination results from the classifier 42 indicates that reception is necessary, the memory access unit 44 refers to the sub-area 1332 and stores the reception data in the data area 136.

The control unit 45 receives a transmission instruction and a reception instruction from the processor 11a by the data access 314 and transmits a completion notification by the completion interrupt 343. The control unit 45 instructs the memory access units 43 and 44 in response to the transmission instruction and the reception instruction.

Figure 12:
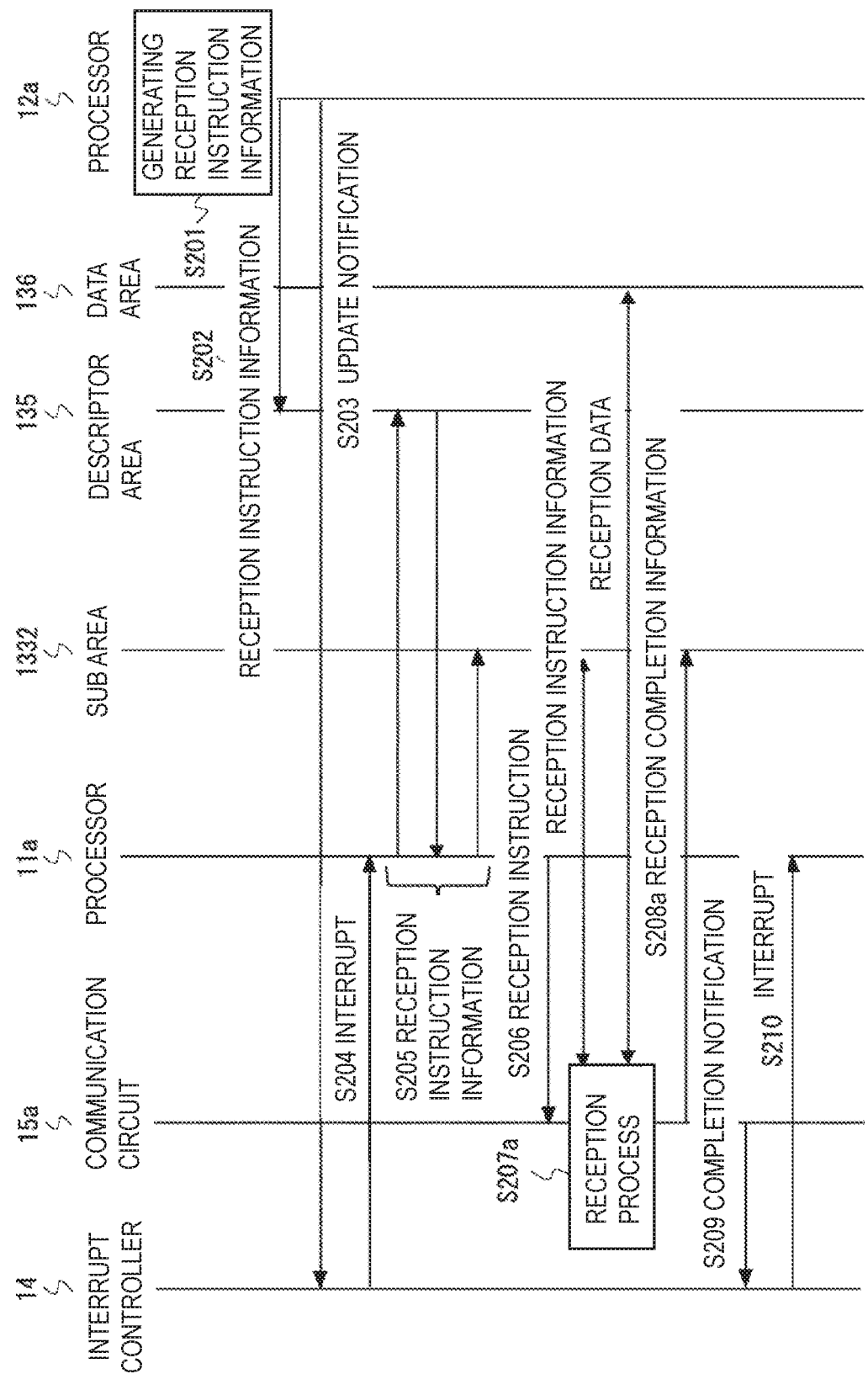
FIG. 12 is a sequence diagram showing a flow of a data reception process according to the embodiment 2.
Figure 13:
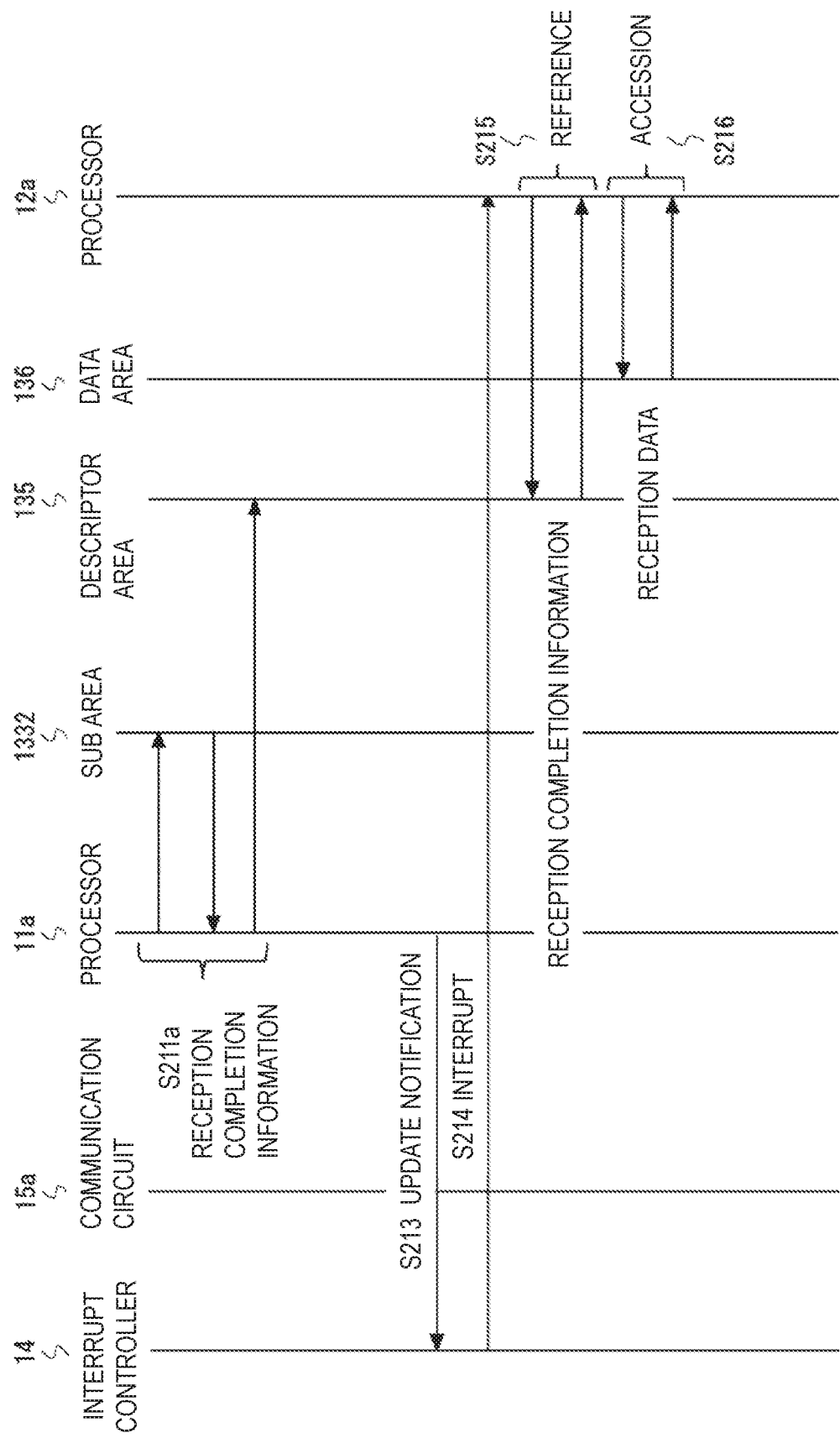
FIG. 13 is a sequence diagram showing the flow of the data reception process according to the embodiment 2.

FIGS. 12 and 13 are sequence diagrams showing the flow of the data reception process according to the present second embodiment. Incidentally, the description of the processes equivalent to those of FIGS. 5 and 6 will be omitted as appropriate. First, the processor 11a reads out the reception instruction information 223 from the descriptor area 135 by the data access 313 in response to the update notification by the IPI interrupt 331 from the processor 12a. Then, the processor 11a stores, i.e., S205a, the read reception instruction information 223 as the reception instruction information 222 in the sub-area 1332 by the data access 311. At this time, the processor 11a sets the address in the reception instruction information 223 as the reception instruction information 222 as it is without changing the address.

In response to the reception instruction (S206) from the processor 11a, the communication circuit 15a refers to the reception instruction information 221 and 222 in the sub-areas 1331 and 1332 by the data accesses 3411 and 3412 and receives (S207a) data from the communication network N by the data inputs 346.

Figure 14:
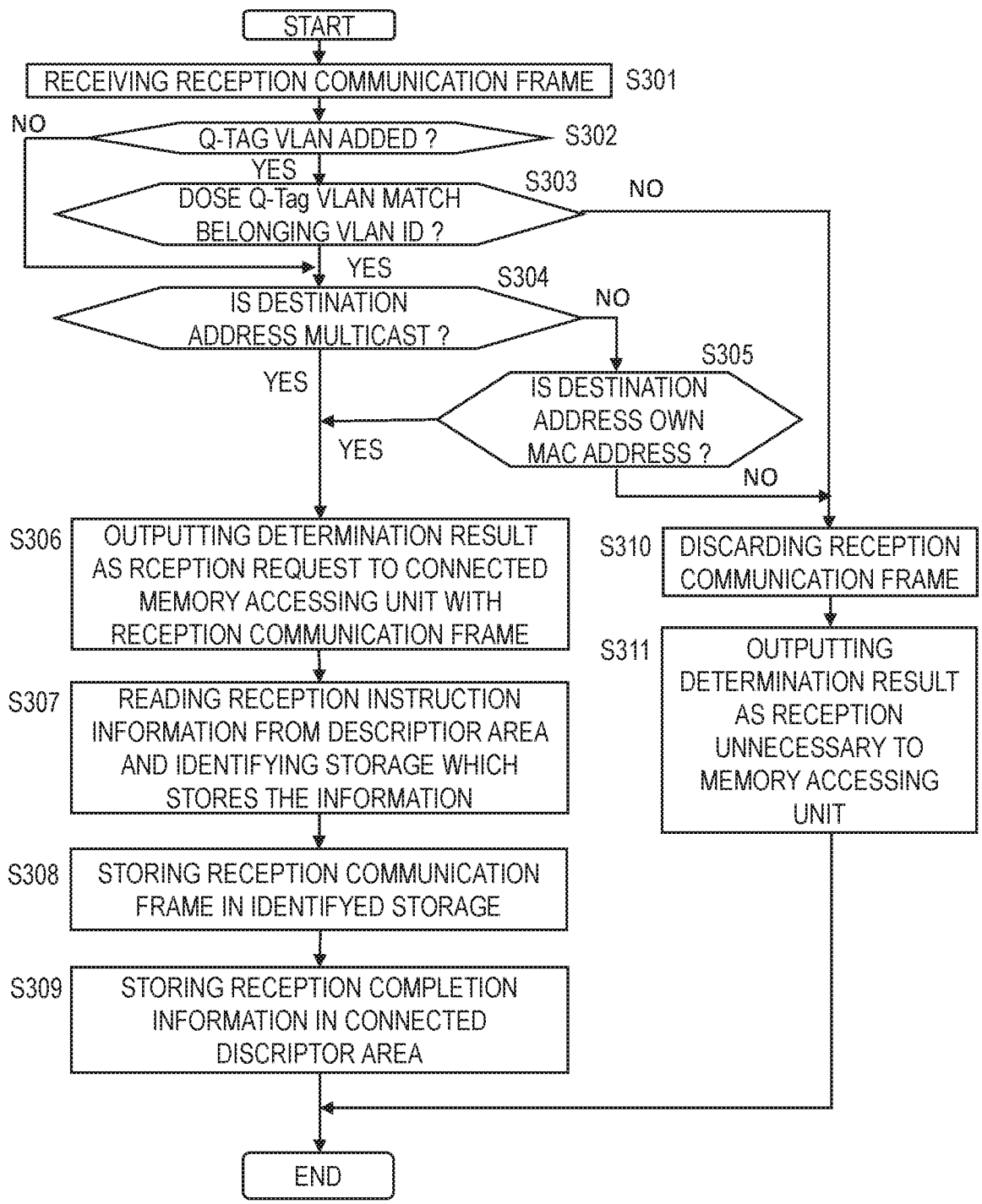
FIG. 14 is a flow chart illustrating the flow of the reception process according to the embodiment 2.

FIG. 14 is a flow chart showing a flow of a reception process according to the present second embodiment. Note that FIG. 14 shows the same processing regardless of the combination of the classifier 41 and the memory access unit 43 or the combination of the classifier 42 and the memory access unit 44. In the following description, a combination of the classifier 42 and the memory access unit 44 will be described.

First, the classifier 42 receives a reception communication frame as reception data (S301). Next, the determination unit 422 judges whether or not a Q-Tag VLAN is added to the headers of the reception communication frames (S302). Here, "Q-Tag VLAN" is defined in IEEE Std 802.1Q (registered trademark)-2014, IEEE Standard for Local and metropolitan area networks-Bridges and Bridged Networks. If the step 302 is NO, the process proceeds to a step S304. In addition, if the step S302 is YES, the determination unit 422 determines whether or not the Q-Tag VLAN matches the belonging VLANID (S303). Specifically, the determination unit 422 reads the belonging VLAN ID 4231 from the storage unit 421 and determines whether the Q-Tag VLAN matches the belonging VLAN ID4231. If it is determined in the step S303 that they coincide with each other, the process proceeds to the step S304.

Next, the determination unit 422 determines whether or not the destination address of the reception communication frame is a broadcast/multicast address (S304). Specifically, when the 8th bit of the destination address is 1, the determination unit 422 determines that the destination address is broadcast/multicast and proceeds to a step S306. On the other hand, when the step S304 of steps is NO, the determination unit 422 determines whether or not the destination address is its own MAC address (S305). Specifically, the determination unit 422 reads the MAC address 4232 from the storage unit 421 and determines whether the destination address matches the MAC address 4232. If it is determined in step S305 that they coincide with each other, the process proceeds to step S306.

If the determination result is Yes in step S304 or step S305, the determination unit 422 outputs the determination result as a reception request to the connected memory accessing unit 44 together with the reception communication frame (S306).

Since the determination result is required to be received, the memory access unit 44 reads the reception instruction information 222 from the sub-area 1332 that is the connected descriptor area by the data access 3412 and identifies the storage destination as the address in the data area 136 (S307). Then, the memory access unit 44 stores the reception communication frame as the reception data 242 in the data area 136, which is the specified storage destination, by the data access unit 344 (S308). After that, the memory access unit 44 stores the reception completion information in the reception instruction information 222 in the sub-area 1332 by the data access 3412 (S309, the step S208a of FIG. 12).

On the other hand, if the determination results in the step S303 or the step S305 is NO, the determination unit 422 discards the reception communication frame (S310). Then, the determination unit 422 outputs the determination result to the memory accessing unit 44 connected as a reception unnecessary (S311).

Returning to FIG. 12, the description will be continued. The communication circuit 15a notifies the processor 11 of the completion by the completion interrupt 343 (S209 and S210).

In response to the completion notification by the completion interrupt 343, the processor 11a reads out the reception instruction information 222 (reception completion information) from the sub-area 1332 by the data access 3112 (see FIGS. 10 and 13), and stores it in the descriptor area 135 by the data access 313, that is, updates or copies the reception instruction information 223 (reception completion information) (S211a). At this time, the copy processing of the reception data does not occur. Thereafter, the steps S213 to S216 are performed in the same manner by the processors 11a and 12a as described above.

As described above, in the first embodiment (FIG. 2), the processor 11 stored data received in the data area 134 managed by the processor 12 and copied the reception data to the shared area 136 accessible by the processor 12 through inter-OS communication. On the other hand, in the second embodiment, it is possible to reduce the copy processing of the reception data associated with the inter-OS communication. Therefore, the processing load of the processor can be further reduced as compared with the first embodiment. Further, even if compared with the first embodiment, it can be said that the processing load of the processor can be reduced by eliminating the copy processing of the reception data by the reception process alone.

Embodiment 3

Embodiment 3 is an improvement example of Embodiment 1 described above. In the first embodiment, as described above, the processor 11 reads the transmission instruction information 213 from the descriptor area 135 in response to the update notification by the IPI interrupt 331 from the processor 12 and stores it in the descriptor area 133. At this time, the processor 11 may also generate a descriptor and store the descriptor in the descriptor area 133. In this case, as described above, the descriptors of the respective OSs are integrated in the descriptor area 133.

Here, once a data transmission request for the communication network N is generated, each of the OS 131 and 132 successively generates a plurality of descriptors and successively stores the descriptors in the descriptor area. Therefore, the storage timings of the transmission instruction information unique to the OS 131 and the transmission instruction information of the OS 132 conflict with each other. If no arbitration is performed for the storage timings, the storage of the descriptors of one of the OSs may be delayed, and the QoS (Quality of Service) is not secured. A similar problem may occur in the reception instruction information.

Therefore, in the third embodiment, by changing the process of copying descriptors in the OS 131 executed by the processor 11 in the first embodiment, the number of descriptors stored in each OS, the data size, and the like are adjusted, and by controlling the communication capacities of each OS, the QoS control is realized.

That is, in response to the first update notification, the first processor controls the order in which the first transmission instruction information stored in the second descriptor area and the second transmission instruction information corresponding to the transmission data stored in the first data area are stored in the first descriptor area based on the ratio of the communication capacity set in advance for the first OS corresponding to the second transmission instruction information and the second OS corresponding to the first transmission instruction information. In this manner, when descriptors of a plurality of OSs are mixed in one descriptor area, QoS control can be realized by controlling the communication capacity of each OS.

Further, the first processor may use a ratio obtained by allocating the size or the number of pieces of the first transmission instruction information and the second transmission instruction information per unit time as a ratio of the preset communication capacities of the first OS and the second OS. As a result, QoS control can be more effectively realized.

The semiconductor device according to the third embodiment is obtained by changing the process of copying the descriptor in the OS 131 executed by the processor 11 in the first embodiment. Therefore, the hardware configuration and the functional block diagram are the same, and thus illustration and description thereof are omitted.

Here, the following Embodiment 3-1 and 3-2 can be cited as an example of the method for allocating the communication capacities of the respective OSs. However, the allocation method is not limited to these.

Embodiment 3-1: Round Robin Method

Figure 15:
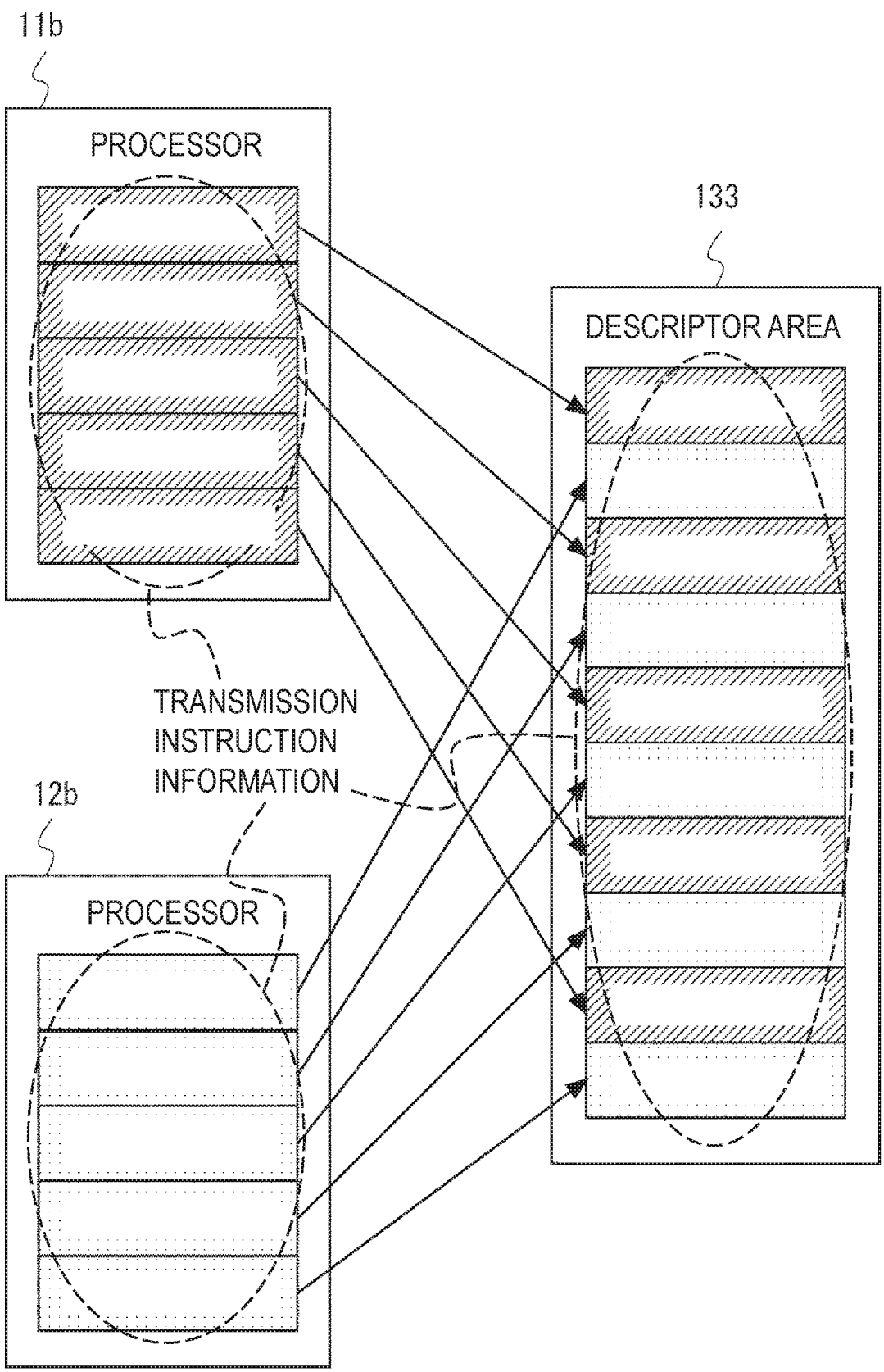
FIG. 15 is a diagram illustrating an exemplary descriptor composition when the communication capacities are evenly allocated to respective OSs according to the Round Robin method according to embodiment 3.

Embodiment 3-1 assumes that the communication capacity is evenly allocated to the OS 131 in advance between the OS 131 side and the OS 132 side. Then, the processor 11 alternately reads out a plurality of pieces of transmission instruction information 213 from the descriptor area 135 in order and stores the pieces of transmission instruction information in the descriptor area 133 and stores the OS 131 pieces of transmission instruction information in the descriptor area 133. At this time, the processor 11 controls the amount of data to be transmitted by each transmission instruction information so as to have the same size. FIG. 15 is a diagram illustrating a composite example of a descriptor when the communication capacity of present embodiment 3 is equally allocated for each OS (Round Robin method).

Embodiment 3-2: Token Bucket Method

Embodiment 3-2 assumes that the cumulative upper limit of the cumulative size for each unit of time has been set individually for each of the OS 131 and the OS 132 in advance for the OS 131. Then, the processor 11 becomes Token Bucket by controlling the switching of the descriptors of the OS 131 and the OS 132 for each hour. For example, the processor 11 calculates in advance the ratio of the communication capacity between the OSs so as to satisfy the upper limit value of the cumulative size and calculates the size of the descriptor allocable per unit time. When integrating descriptors, the processor 11 divides and stores the descriptors according to the calculated values and switches the target OS for each time unit.

Figure 16:
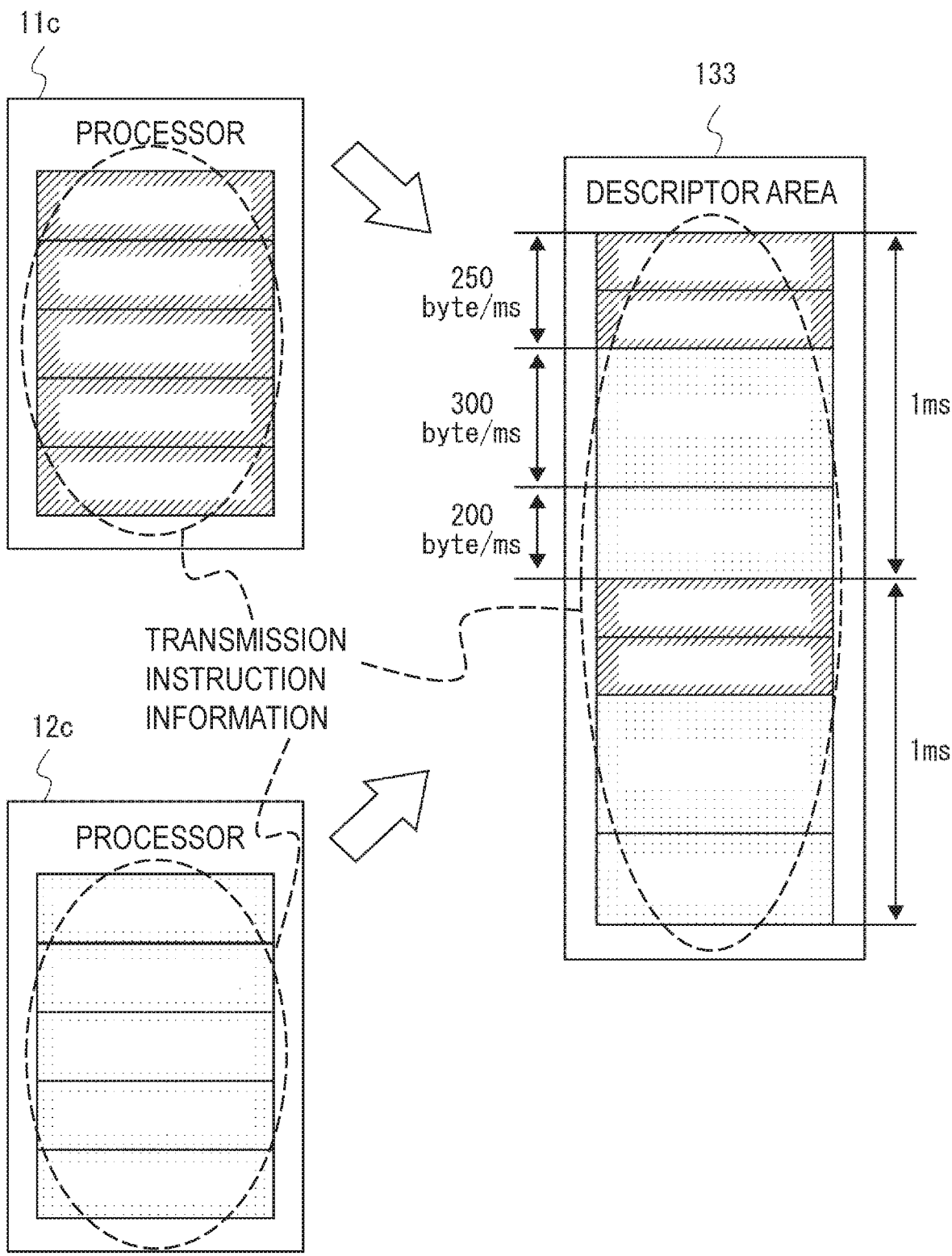
FIG. 16 is a diagram showing an exemplary descriptor composition of the Token Bucket method when a maximum size of an accumulated size of the descriptors per unit time is set for each OS according to the embodiment 3.

FIG. 16 is a diagram showing an exemplary Token Bucket method of synthesizing descriptors when each of the upper limit OSs of cumulative sizes of descriptors per unit time is set according to present embodiment 3. In FIG. 16, the transmission rate on the processor 11c side (hatched portion) is allocated to 2 Mbps (250 bytes/ms), and the transmission rate on the processor 12c side (dotted portion) is allocated to 4 Mbps (500 bytes/ms). At this time, 1 Mbps=(1000000/8)/1000=125 bytes per milliseconds. In this manner, QoS control becomes possible.

Here, when the OS 131 operating in the processor 11 is a secure OS, even if an abnormal Ethernet frame transfer request from another OS 132 occurs, the descriptor is copied only within the ratio of the communication capacities set in the respective OSs, as described above. As a result, excessive frame transfer requests can be blocked. In particular, if the OS 132 requires an abnormal quantity of Ethernet frames to be transmitted, it is possible that a malicious application is running or runaway. Therefore, the third embodiment is effective as a function safety control for suppressing an adverse influence on an external system. In addition, by using the secure OS for the OS 131 operated by the processor 11, it is possible to suppress the malfunction of another OS 132, thereby suppressing the illegal operation and improving the robustness of the system.

In the embodiment described above, the case where the processor and the OS are one-to-one is described, but the embodiment is not limited to this, and each embodiment can be applied even if the ratio between the number of processors and the number of OSs is different. In addition, a hypervisor may be interposed in the inter-OS communication. The communication circuit is not limited to Ethernet communication hardware.

In the embodiment described above, a single semiconductor device has been described, but the embodiments are also applicable to information processing systems. In this case, the information processing system can have the following configuration. That is, the information processing system includes a first processor and a second processor that execute different OSs (Operating System), a memory, and communication circuit controlled by the first processor, wherein the memory includes a first descriptor area and a first data area that are work areas of the first OS executed by the first processor, and a second descriptor area and a second data area that are work areas of the second OS executed by the second processor, wherein the second processor stores first transmission instruction information corresponding to transmission data stored in the second data area in the second descriptor area, and transmits a first update notification of the second descriptor area to the first processor, wherein the first processor reads the first transmission instruction information stored in the second descriptor area, stores the first transmission instruction information in the first descriptor area, and stores the first transmission instruction information in the first descriptor area. The communication circuit performs transmission process of the transmission data stored in the second data area based on the first transmission instruction information stored in the first descriptor area. As a result, the same effect as that of the first embodiment can be obtained.

Although the invention made by the inventor has been specifically described based on the embodiment, the present inventions are not limited to the embodiments already described, and it is needless to say that various modifications can be made without departing from the gist thereof.

What is claimed is:

1. A semiconductor device comprising:
   a first processor and a second processor for executing a different OS (Operating System);
   a memory; and
   a communication circuit controlled by the first processor,
   wherein the memory includes:
     a first descriptor area and a first data area, which are working areas of a first OS executed by the first processor; and
     a second descriptor area and a second data area, which are working areas of a second OS executed by the second processor,
   wherein the second processor stores first reception instruction information in the second descriptor area for storing reception data in the second data area, transmits a third update notification of the second descriptor area to the first processor,
   wherein the first descriptor area includes a first sub-area corresponding to the first data area and a second sub-area corresponding to the second data area,
   wherein the first processor stores the first reception instruction information read from the second descriptor area in the second sub-area in response to the third update notification,
   wherein the communication circuit 1) holds i) first communication address information corresponding to the first OS or the first processor and ii) second communication address information corresponding to the second OS or the second processor, 2) determines whether each of the first and second communication address information is included in a destination of the reception data, 3) stores the reception data in the second data area when it is determined that the second communication address information is included in the destination, and 4) notifies a completion notification to the first processor, and
   wherein the first processor updates the first reception instruction information stored in the second descriptor area and transmits a fourth update notification of the second descriptor to the second processor.

2. The semiconductor device according to claim 1, wherein
   the communication circuit includes a first classifier accessible to the first data area and the first sub-area, and a second classifier accessible to the second data area and the second sub-area,
   the communication circuit inputs the reception data to each of the first classifier and the second classifier, and
   the second classifier identifies the second data area as the destination based on the first reception instruction information stored in the second sub-area and stores the reception data in the second data area when determining that the second communication address information is included in the destination.

3. The semiconductor device according to claim 1, wherein the second descriptor area is a shared area accessible to data from each of the first processor operating the first OS and the second processor operating the second OS.

* * * * *